US008319901B2

(12) United States Patent
Takata et al.

(10) Patent No.: US 8,319,901 B2

(45) Date of Patent: Nov. 27, 2012

(54) DISCHARGE TUBE SUPPORTING STRUCTURE, SUPPORTING MEMBER, DISCHARGE TUBE, FERRULE, LIGHTING DEVICE, DISPLAY DEVICE AND TELEVISION RECEIVER

(75) Inventors: Yoshiki Takata, Osaka (JP); Kenichi Iwamoto, Osaka (JP); Takaaki Kudo, Tokyo (JP); Naofumi Ikenaga, Tokyo (JP)

(73) Assignees: Sharp Kabushiki Kaisha, Osaka (JP); Japan Aviation Electronics Industry, Limited, Tokyo (JP)

( * ) Notice: Subject to any disclaimer, the term of this patent is extended or adjusted under 35 U.S.C. 154(b) by 446 days.

(21) Appl. No.: 12/516,361

(22) PCT Filed: Jun. 4, 2007

(86) PCT No.: PCT/JP2007/061293

§ 371 (c)(1), (2), (4) Date: Jun. 30, 2009

(87) PCT Pub. No.: WO2008/065763

PCT Pub. Date: Jun. 5, 2008

(65) Prior Publication Data

US 2010/0066916 A1 Mar. 18, 2010

(30) Foreign Application Priority Data

Nov. 30, 2006 (JP) ................................. 2006-324222

(51) Int. Cl.

*H04N 5/645* (2006.01)
*F21V 19/00* (2006.01)
*F21V 7/04* (2006.01)
*F21S 4/00* (2006.01)
*H01S 3/03* (2006.01)

(52) U.S. Cl. ........ 348/825; 362/382; 362/225; 362/613; 372/65

(58) Field of Classification Search ........................ None
See application file for complete search history.

(56) References Cited

U.S. PATENT DOCUMENTS 5,015,015 A * 5/1991 Fetters .......................... 285/114

(Continued)

FOREIGN PATENT DOCUMENTS

CN 1553467 A 12/2004

(Continued)

OTHER PUBLICATIONS

Takata et al.; "Discharge Tube Supporting Structure, Supporting Member, Discharge Tube, Ferrule, Lighting Device, Display Device and Television Receiver"; U.S. Appl. No. 12/645,731, filed Dec. 23, 2009.

(Continued)

*Primary Examiner* — Joseph Ustaris
*Assistant Examiner* — Frederick Bailey
(74) *Attorney, Agent, or Firm* — Keating & Bennett, LLP

(57) ABSTRACT

Discharge tubes, each of which includes a glass tube and a ferrule that has a substantially cylindrical shape and is fitted to each end portion of the glass tube, are supported by a plurality of pairs of relay connectors (or supporting members) provided on the front side of a chassis having substantially a plate-shaped configuration. When a discharge tube is supported by relay connectors, stoppers provided on the relay connectors lock the ferrules so that axial movement of the discharge tube relative to the relay connectors is restricted.

17 Claims, 25 Drawing Sheets

U.S. PATENT DOCUMENTS

| | | | | | |
|---|---|---|---|---|---|
| 5,317,663 | A | * | 5/1994 | Beard et al. | 385/70 |
| 5,389,010 | A | | 2/1995 | Takano et al. | |
| 5,744,901 | A | | 4/1998 | Friederichs et al. | |
| 7,434,957 | B2 | | 10/2008 | Kim et al. | |
| 2004/0001340 | A1 | | 1/2004 | Shin | |
| 2005/0141220 | A1 | | 6/2005 | Kim et al. | |
| 2005/0226002 | A1 | | 10/2005 | Aoki et al. | |
| 2006/0002145 | A1 | | 1/2006 | Moon | |
| 2006/0067072 | A1 | | 3/2006 | Zonta | |
| 2006/0072322 | A1 | | 4/2006 | Lee et al. | |
| 2008/0101074 | A1 | | 5/2008 | Ogura et al. | |
| 2009/0201666 | A1 | | 8/2009 | Takata et al. | |
| 2010/0066916 | A1 | | 3/2010 | Takata et al. | |
| 2010/0097785 | A1 | | 4/2010 | Takata et al. | |
| 2010/0141846 | A1 | | 6/2010 | Takata et al. | |

FOREIGN PATENT DOCUMENTS

| | | | |
|---|---|---|---|
| CN | 1637510 | A | 7/2005 |
| EP | 2 045 509 | A1 | 4/2009 |
| JP | 02-046315 | U | 3/1990 |
| JP | 03-285231 | A | 12/1991 |
| JP | 10-508427 | A | 8/1998 |
| JP | 2002-083504 | A | 3/2002 |
| JP | 2004-294592 | A | 10/2004 |
| JP | 2005-197246 | A | 7/2005 |
| JP | 2006-106665 | A | 4/2006 |
| JP | 4437162 | B2 | 3/2010 |
| KR | 1994-0008160 | A | 4/1994 |
| KR | 10-2005-0069876 | A | 7/2005 |
| TW | 200540528 | A | 12/2005 |
| TW | 200633326 | A | 9/2006 |

OTHER PUBLICATIONS

Takata et al.; "Discharge Tube Supporting Structure, Supporting Member, Discharge Tube, Ferrule, Lighting Device, Display Device and Television Receiver"; U.S. Appl. No. 12/707,950, filed Feb. 18, 2010.

Official Communication issued in corresponding Korean Patent Application No. 10-2009-7011811, issued on Feb. 23, 2011.

Official Communication issued in International Patent Application No. PCT/JP2007/061293, mailed on Jun. 26, 2007.

Official Communication issued in corresponding European Patent Application No. 07767041.2, mailed on Jun. 16, 2010.

English translation of Official Communication issued in corresponding Chinese Patent Application No. 201010002912.4, mailed on Feb. 13, 2012.

* cited by examiner

DISCHARGE TUBE SUPPORTING STRUCTURE, SUPPORTING MEMBER, DISCHARGE TUBE, FERRULE, LIGHTING DEVICE, DISPLAY DEVICE AND TELEVISION RECEIVER

BACKGROUND OF THE INVENTION

1. Field of the Invention

The present invention relates to a discharge tube supporting structure, a supporting member, a discharge tube, a ferrule, a lighting device, a display device and a television receiver.

2. Description of the Related Art

An example of a lighting device capable of functioning as a backlight for a liquid crystal display device is disclosed in JP-A-2004-294592. The lighting device has a construction in which the end portions of a plurality of elongated discharge tubes are fixed to respective connecting members mounted to a substantially flat plate-shaped chassis, and power boards are also fixed to the respective connecting members. An outer lead projecting from the end portion of the discharge tube is connected to the power board via the connecting member.

The outer lead coaxially projects from the end portion of the discharge tube, and therefore the distal end of the outer lead may interfere with a nearby component (e.g., the peripheral wall of the chassis) if the discharge tube axially displaces from the connecting members. The outer lead, which is important as an electrical connecting member, is elongated and low in strength. Therefore, the interference of the outer lead with the nearby component should be prevented.

SUMMARY OF THE INVENTION

In view of the foregoing circumstances, preferred embodiments of the present invention have a structure to restrict the axial movement of a discharge tube.

A discharge tube supporting structure according to a preferred embodiment of the present invention is arranged to support at least one discharge tube on a chassis. The discharge tube includes a glass tube and a ferrule that has a substantially cylindrical shape and is fitted to at least one end portion of the glass tube. The discharge tube supporting structure includes at least one supporting member, which is arranged on the chassis so as to be capable of supporting the discharge tube. A stopper is arranged on the supporting member so as to be capable of locking the ferrule and thereby restricting axial movement of the discharge tube.

According to a preferred embodiment of the present invention, when a discharge tube is supported on supporting members, the stopper locks the ferrule. Therefore, the discharge tube is secure from axial movement relative to the supporting members.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred Embodiment 1

Preferred embodiment 1 according to the present invention will be hereinafter explained with reference to FIGS. 1 to 14.

Overview of Display Device D

Figure 1:
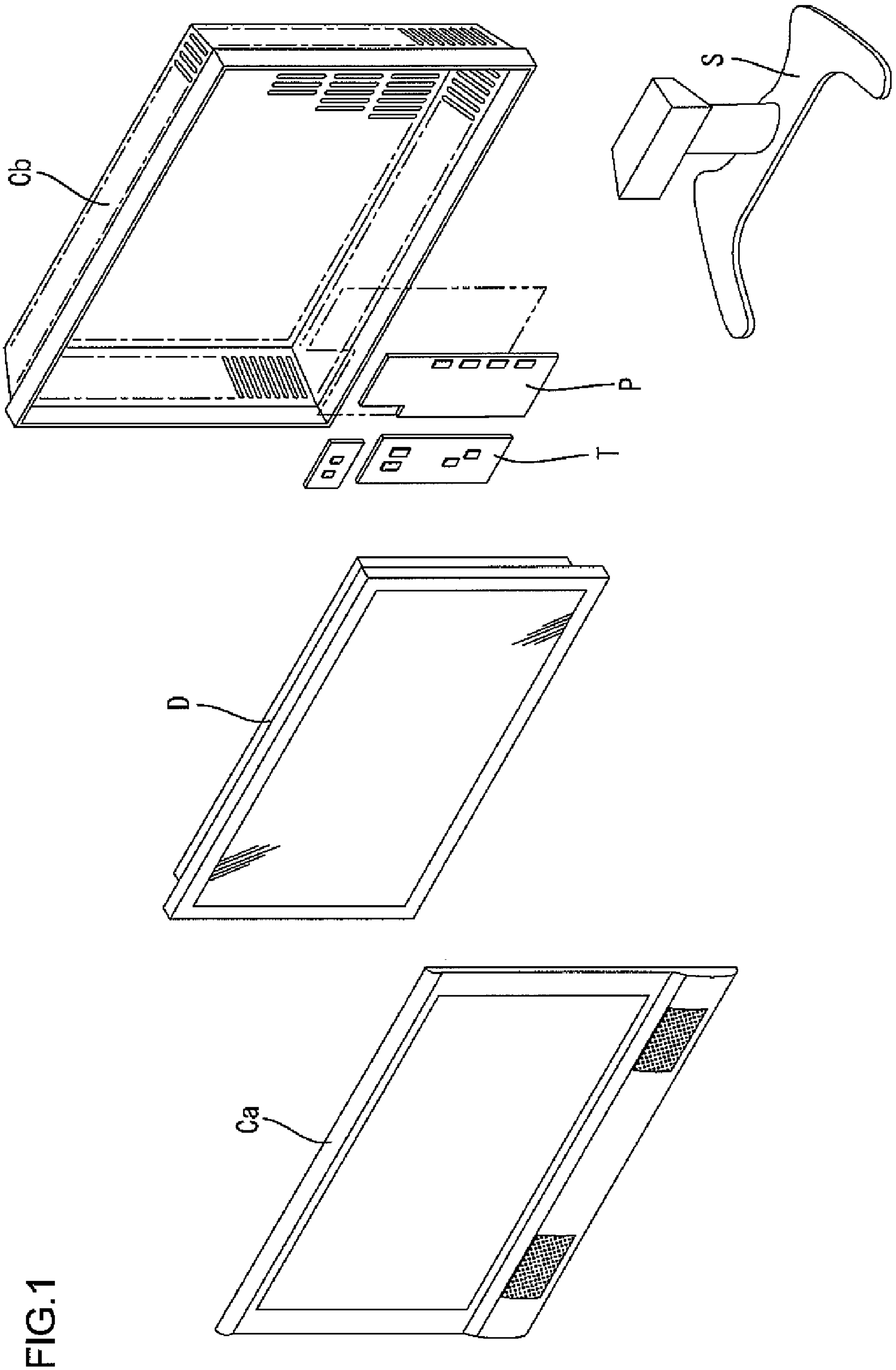
FIG. 1 is an exploded perspective view of a television receiver according to a preferred embodiment 1 of the present invention.
Figure 2:
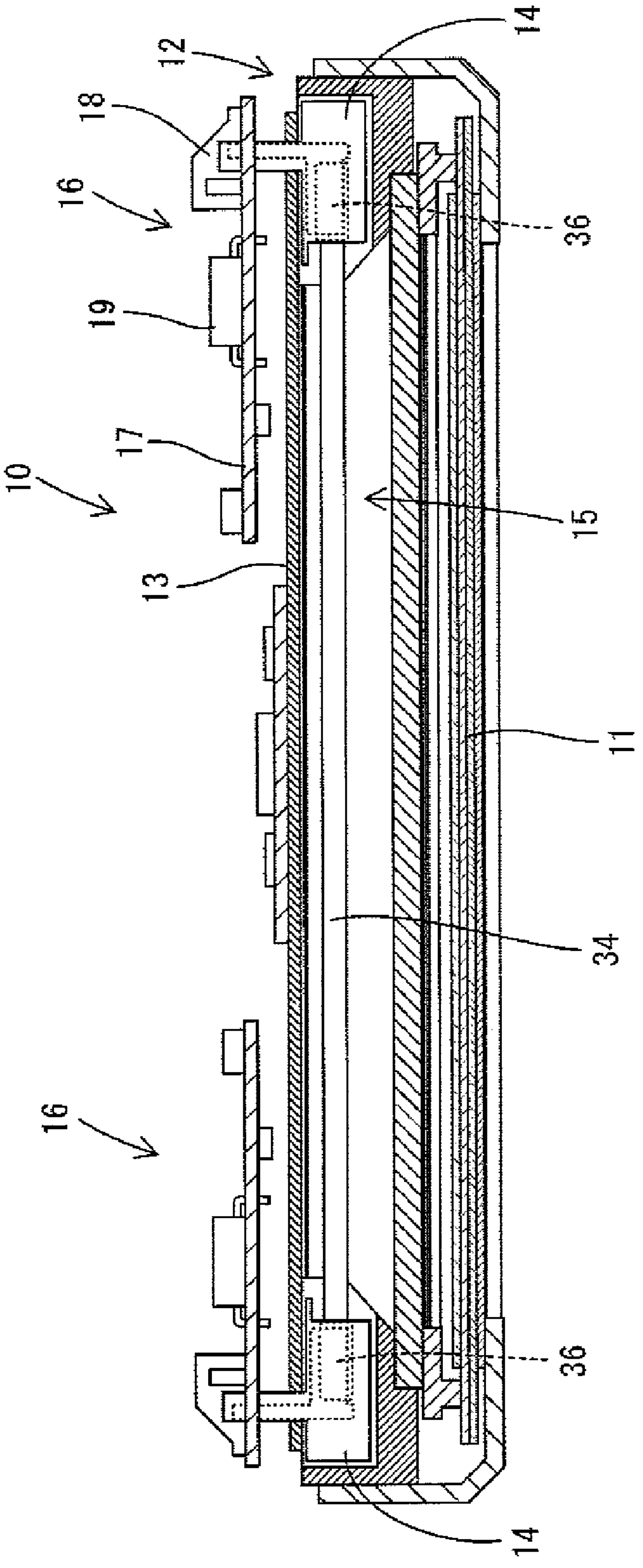
FIG. 2 is a horizontal sectional view of a display device.
Figure 3:
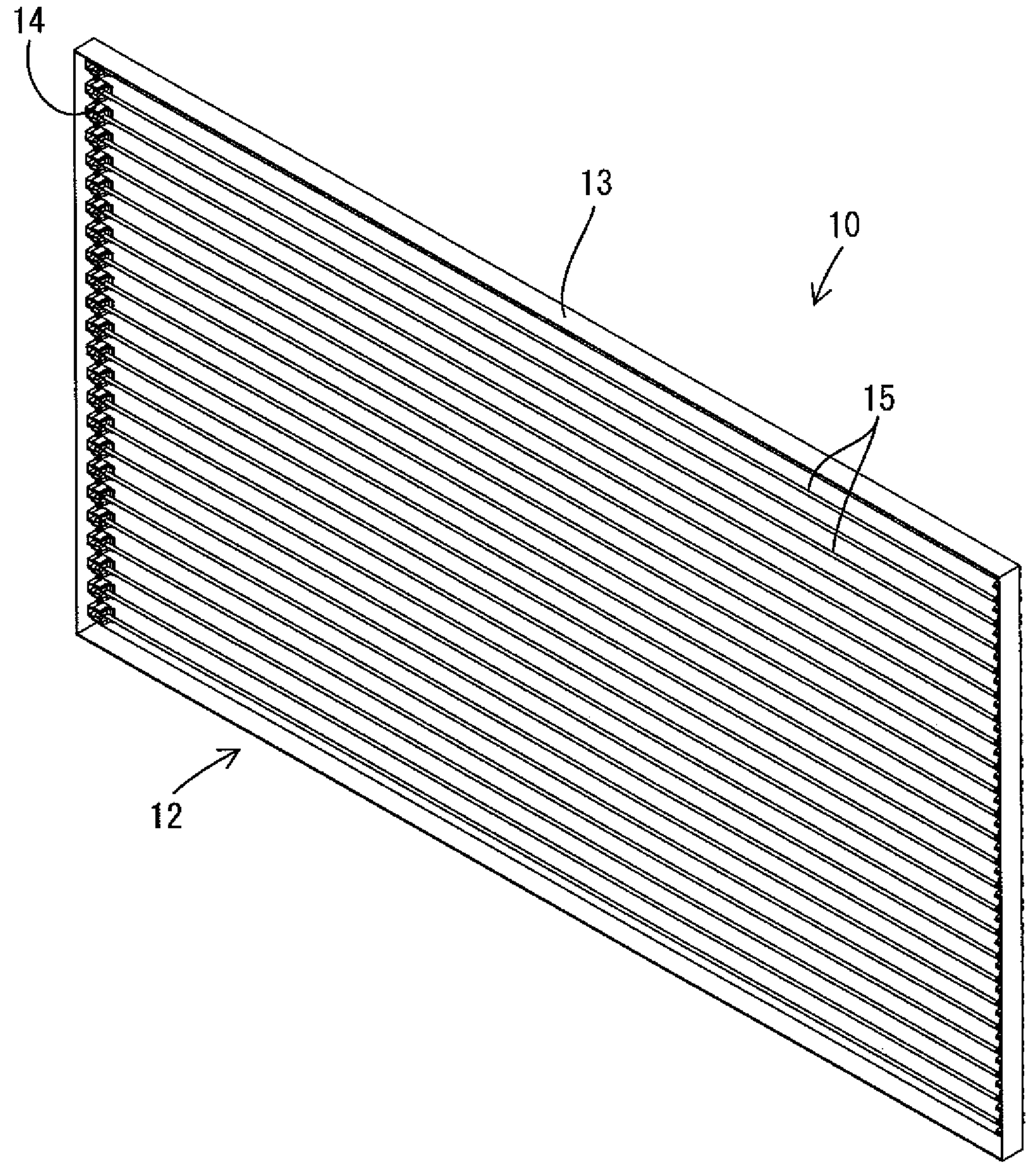
FIG. 3 is a front perspective view of a lighting device.
Figure 4:
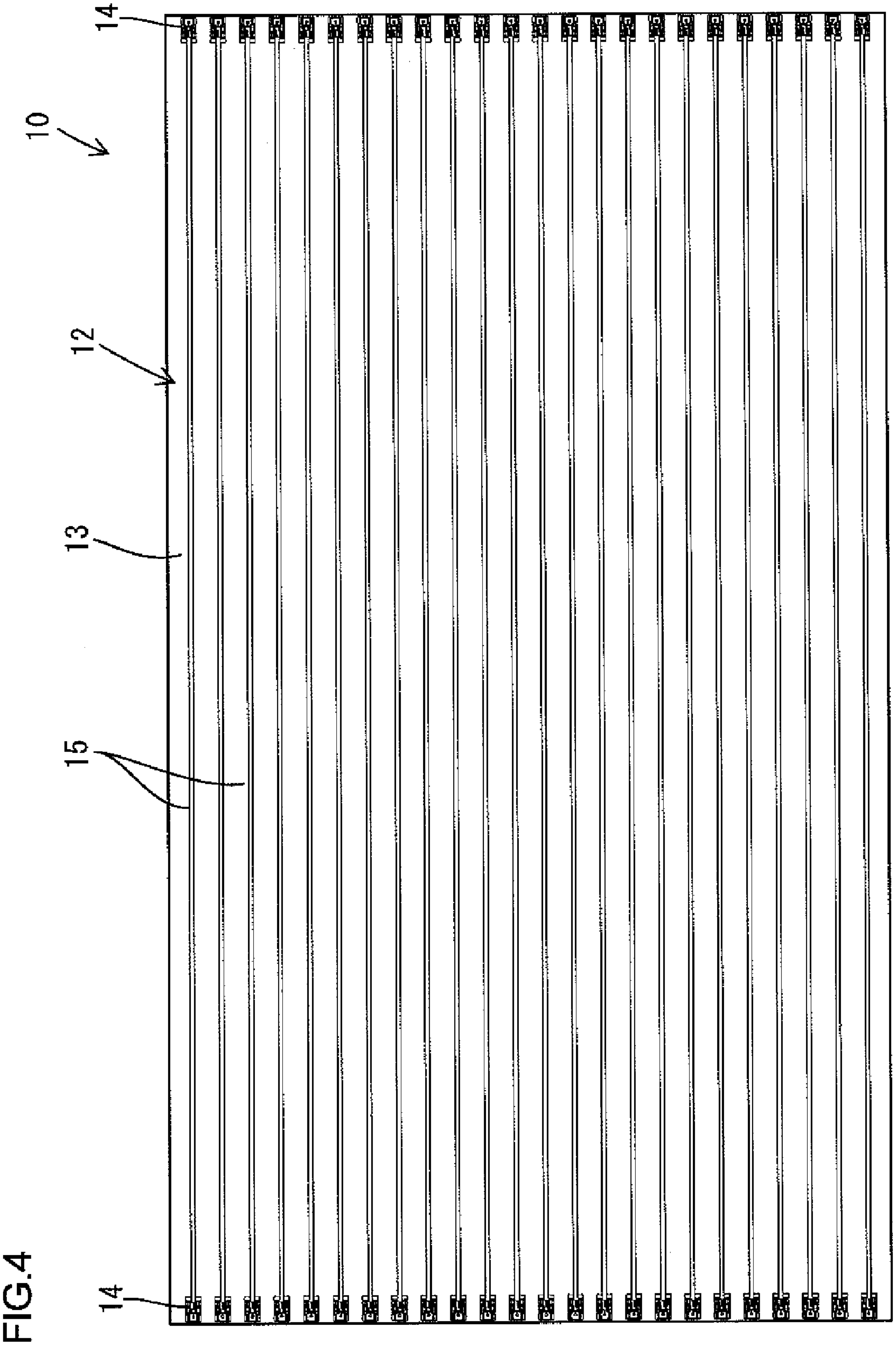
FIG. 4 is a front view of the lighting device.
Figure 5:
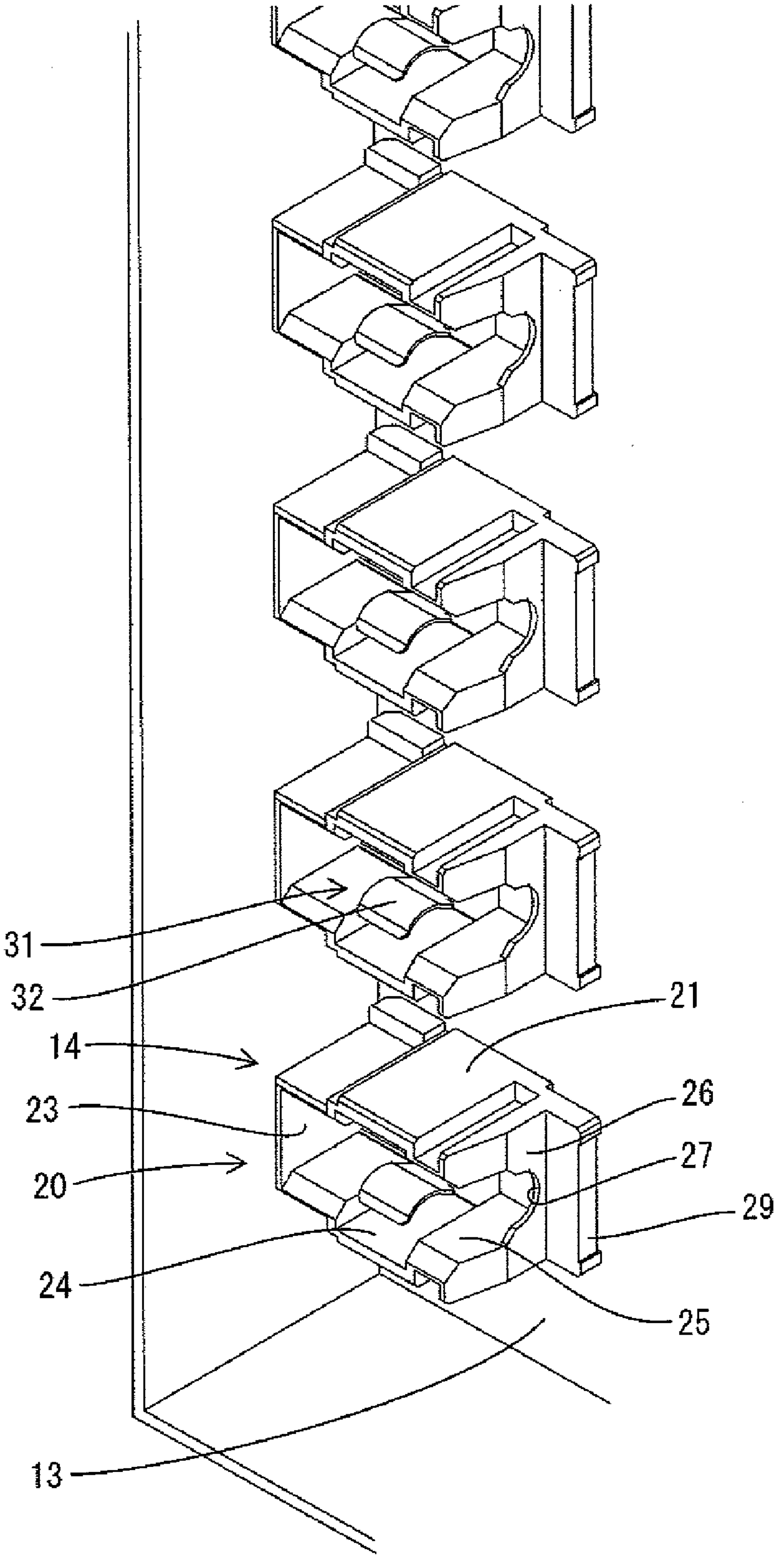
FIG. 5 is a perspective view of relay connectors.
Figure 6:
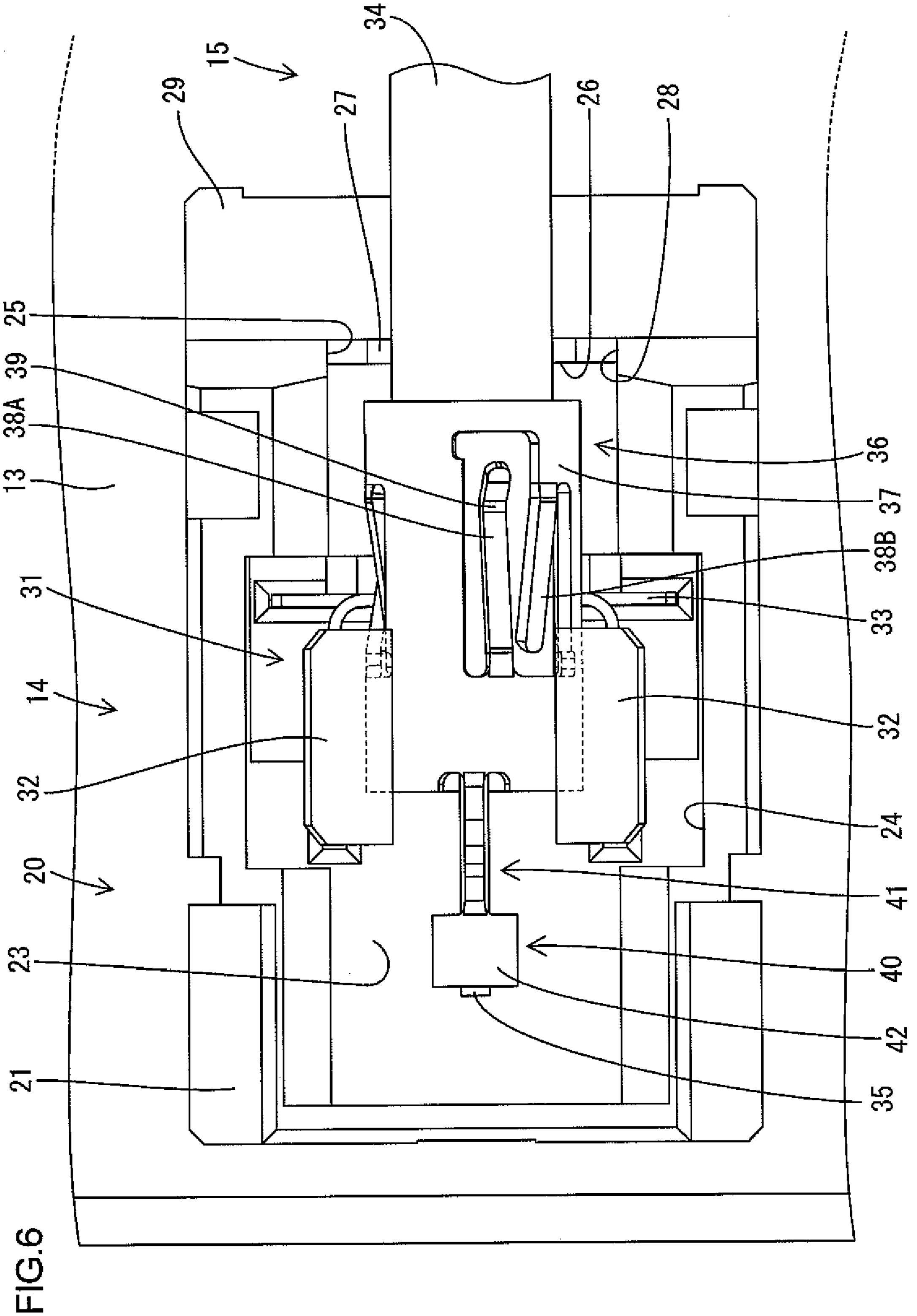
FIG. 6 is a partially-enlarged front view showing a connecting structure between a relay connector and a discharge tube.
Figure 7:
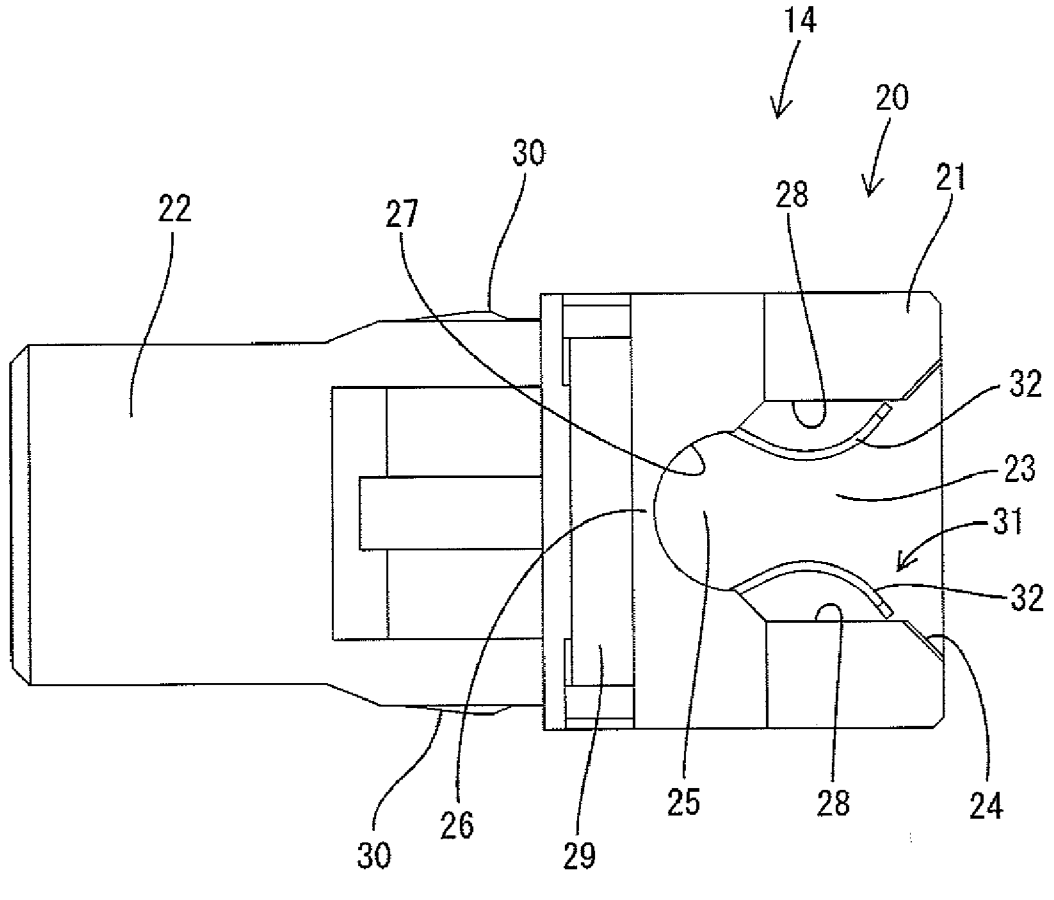
FIG. 7 is a side view of a relay connector.
Figure 8:
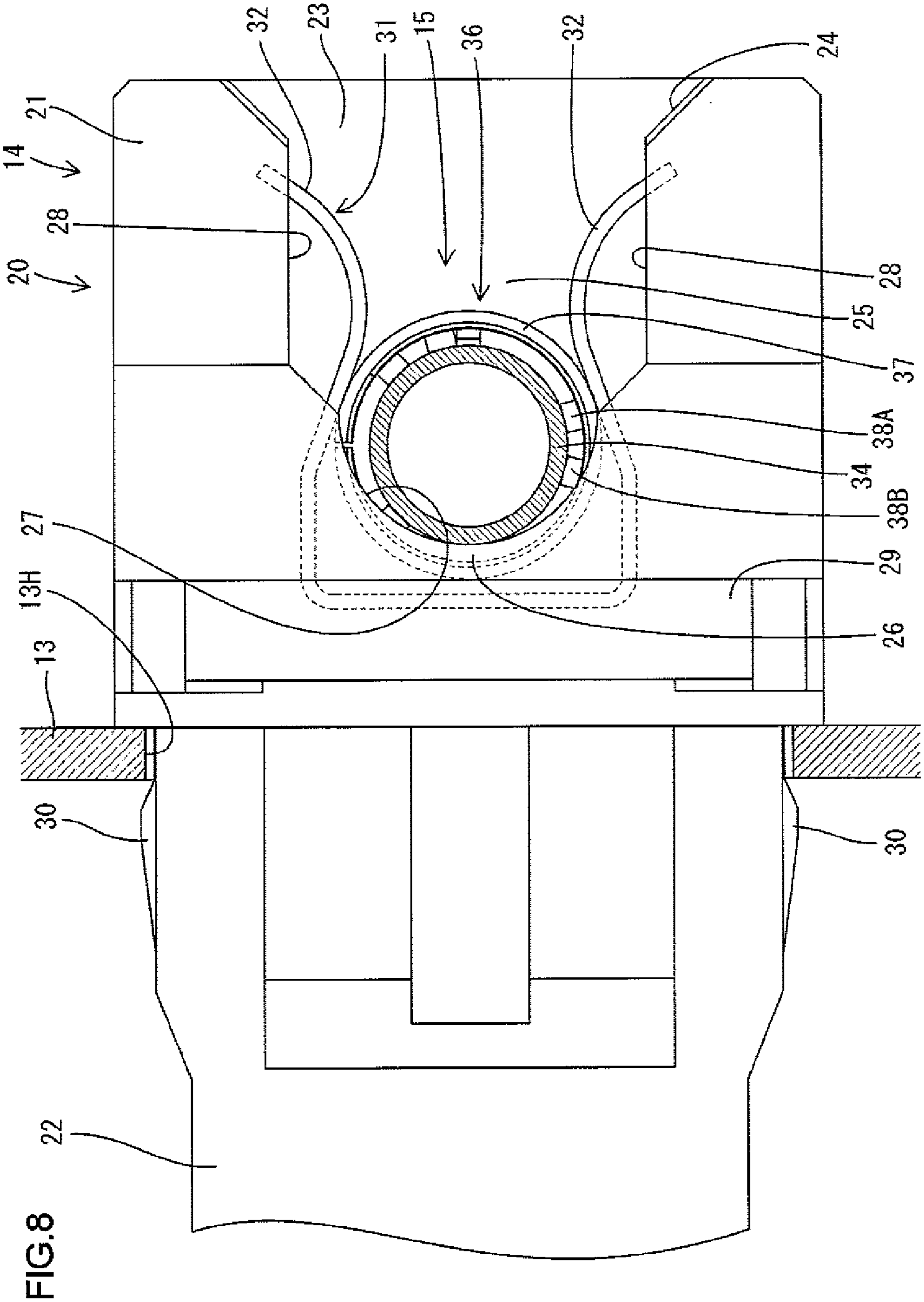
FIG. 8 is a sectional view showing that the ferrule of a discharge tube is capable of engaging with a stopper.
Figure 9:
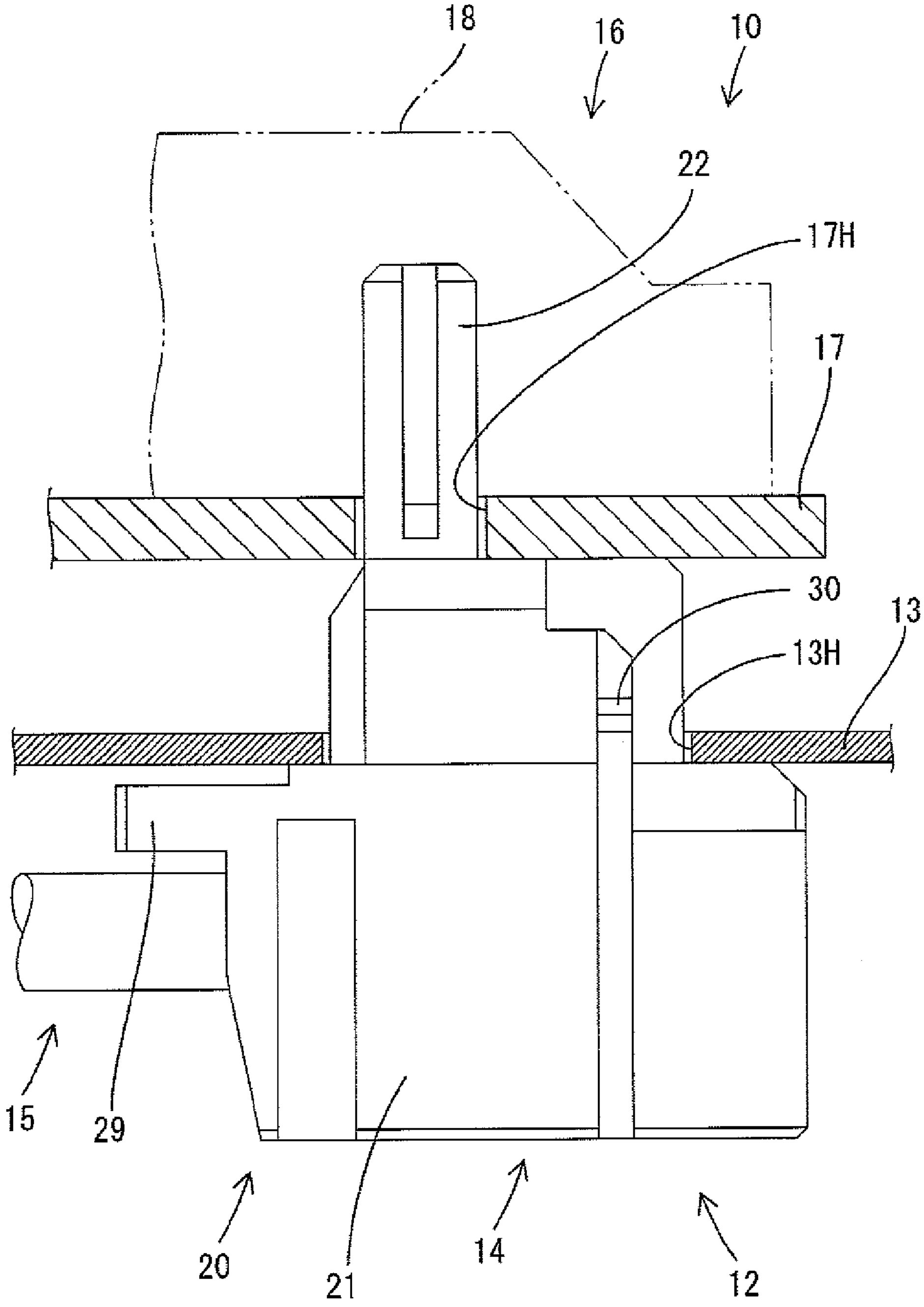
FIG. 9 is a sectional view showing a connecting structure between a relay connector and a power board.
Figure 10:
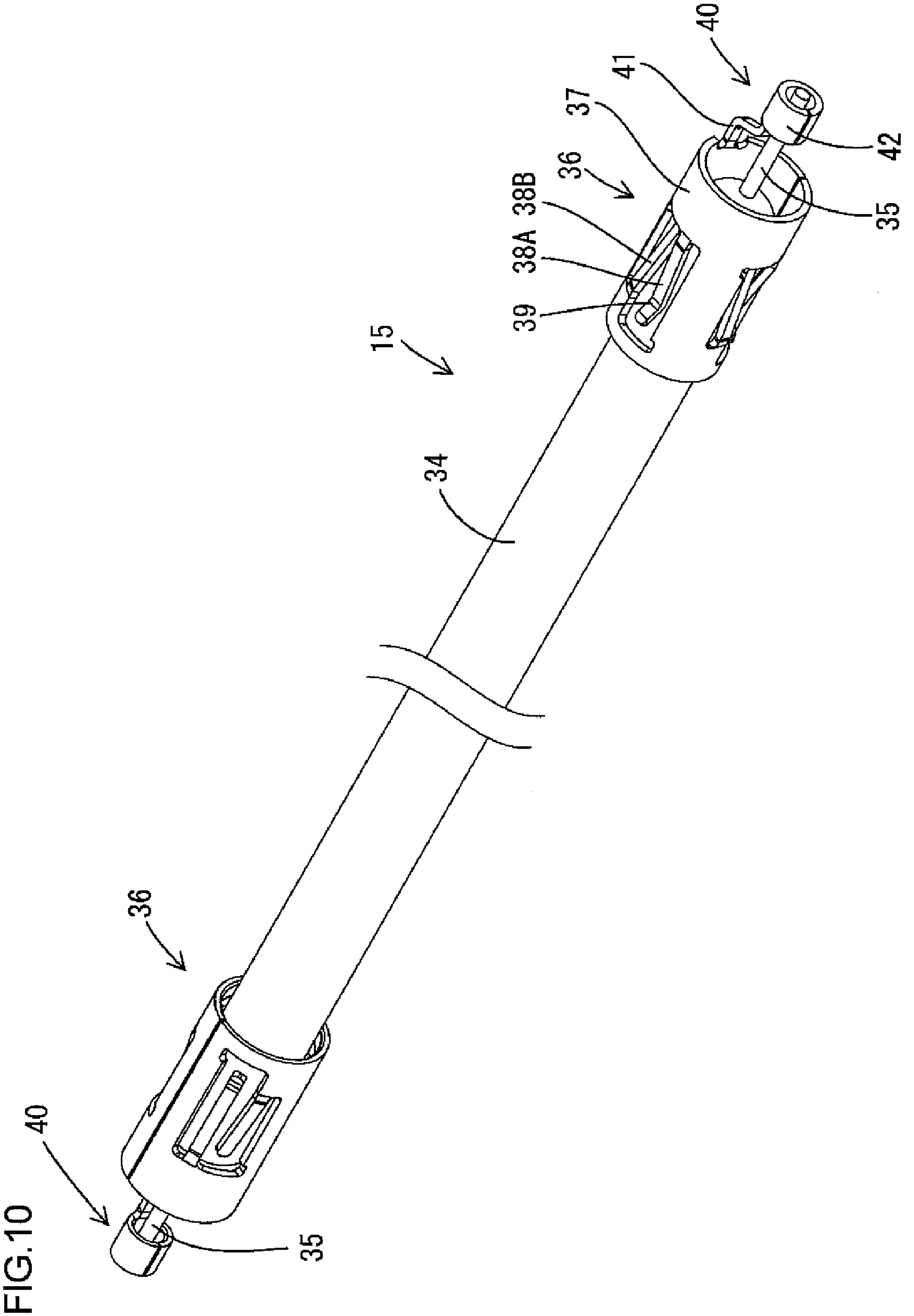
FIG. 10 is a perspective view of a discharge tube.
Figure 11:
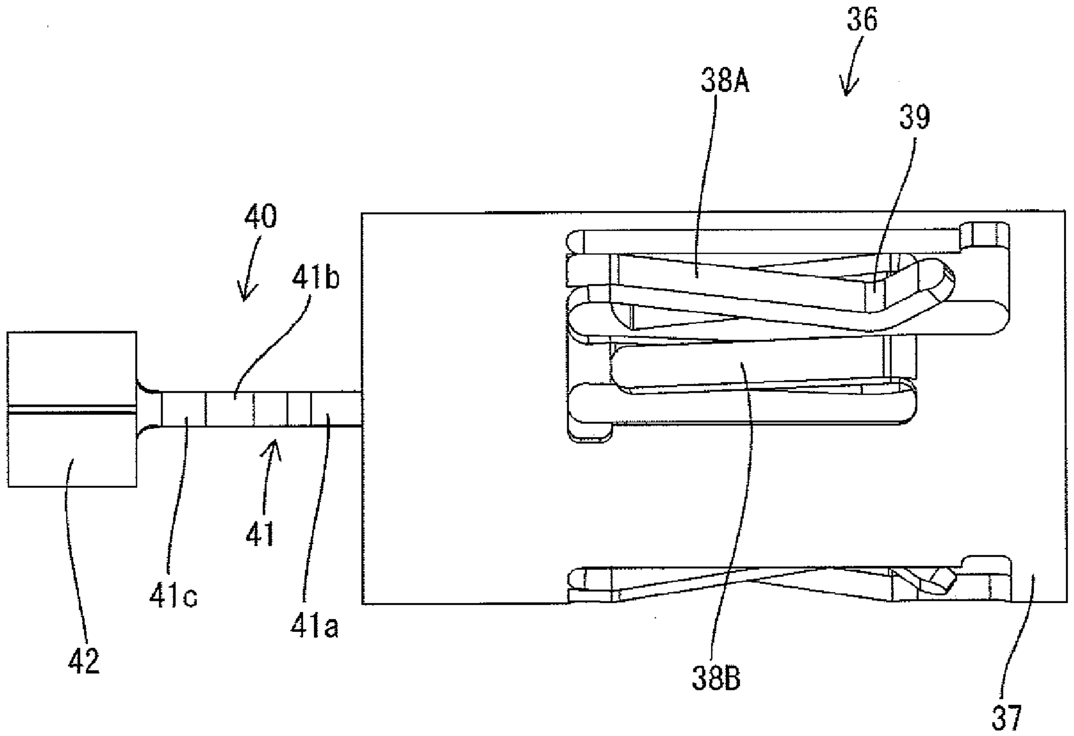
FIG. 11 is a rear view of a ferrule.
Figure 12:
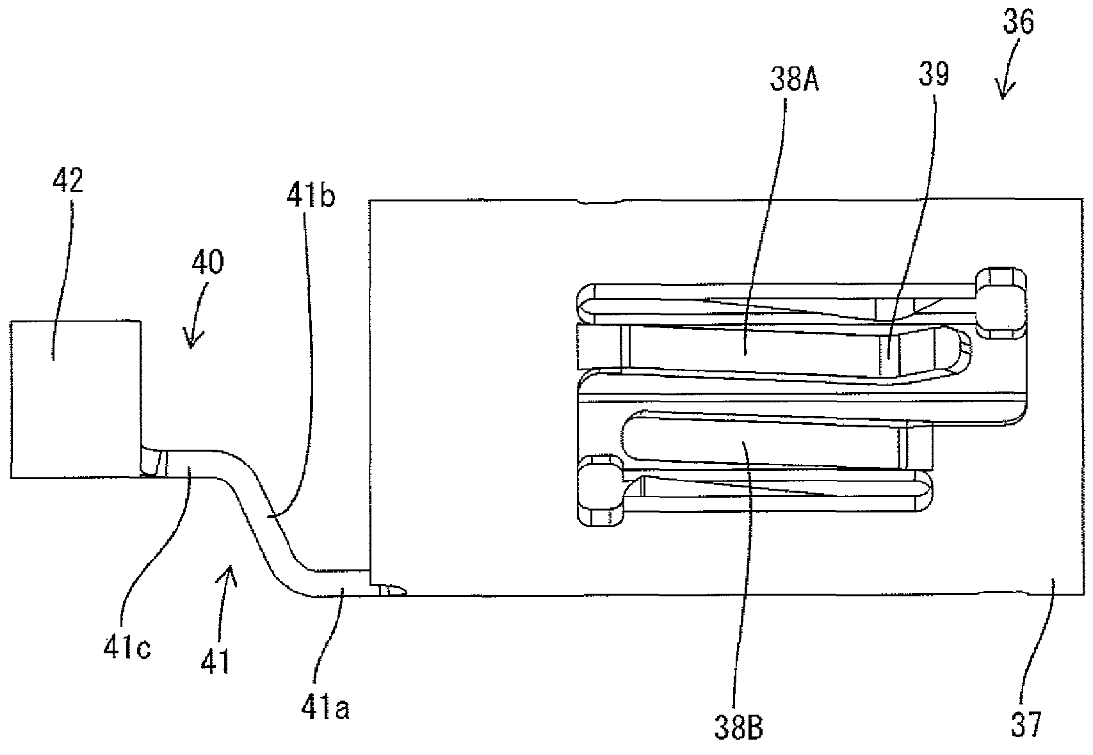
FIG. 12 is a plan view of the ferrule.
Figure 13:
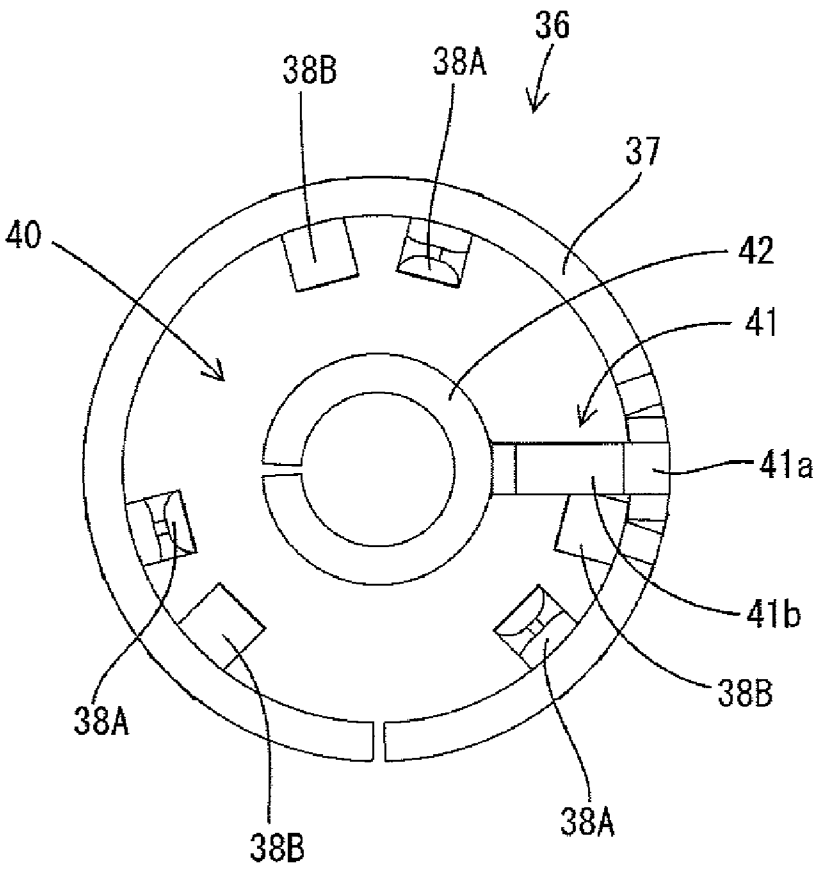
FIG. 13 is a side view of the ferrule.
Figure 14:
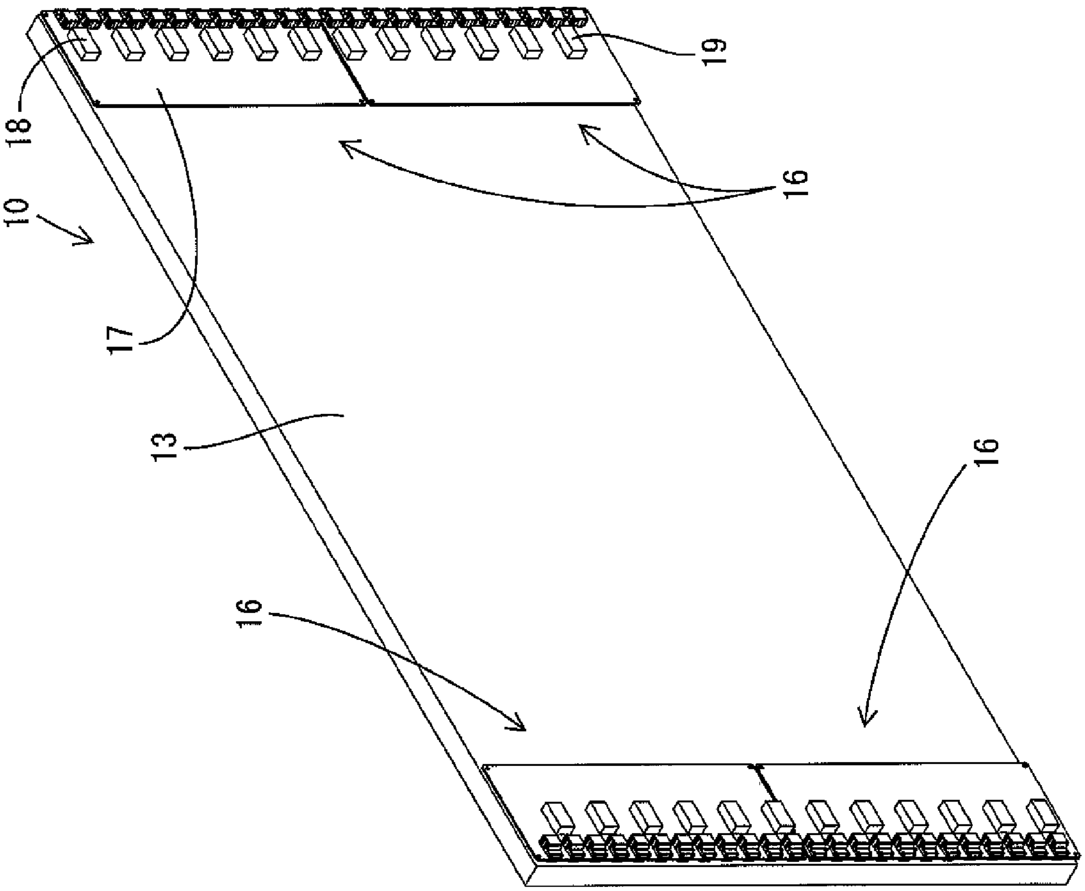
FIG. 14 is a rear perspective view of the lighting device.
Figure 15:
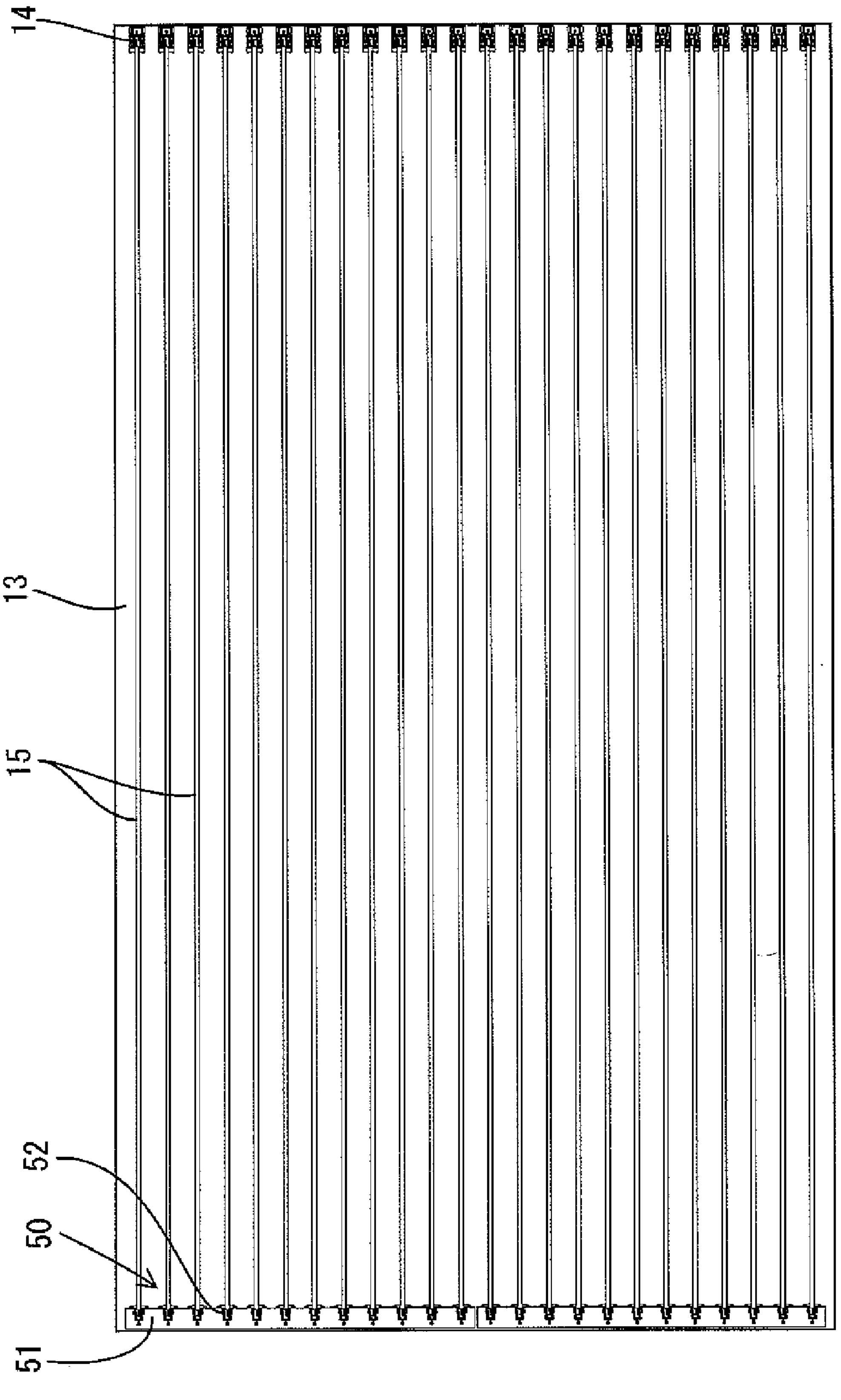
FIG. 15 is a front view of a lighting device according to a preferred embodiment 2 of the present invention.
Figure 16:
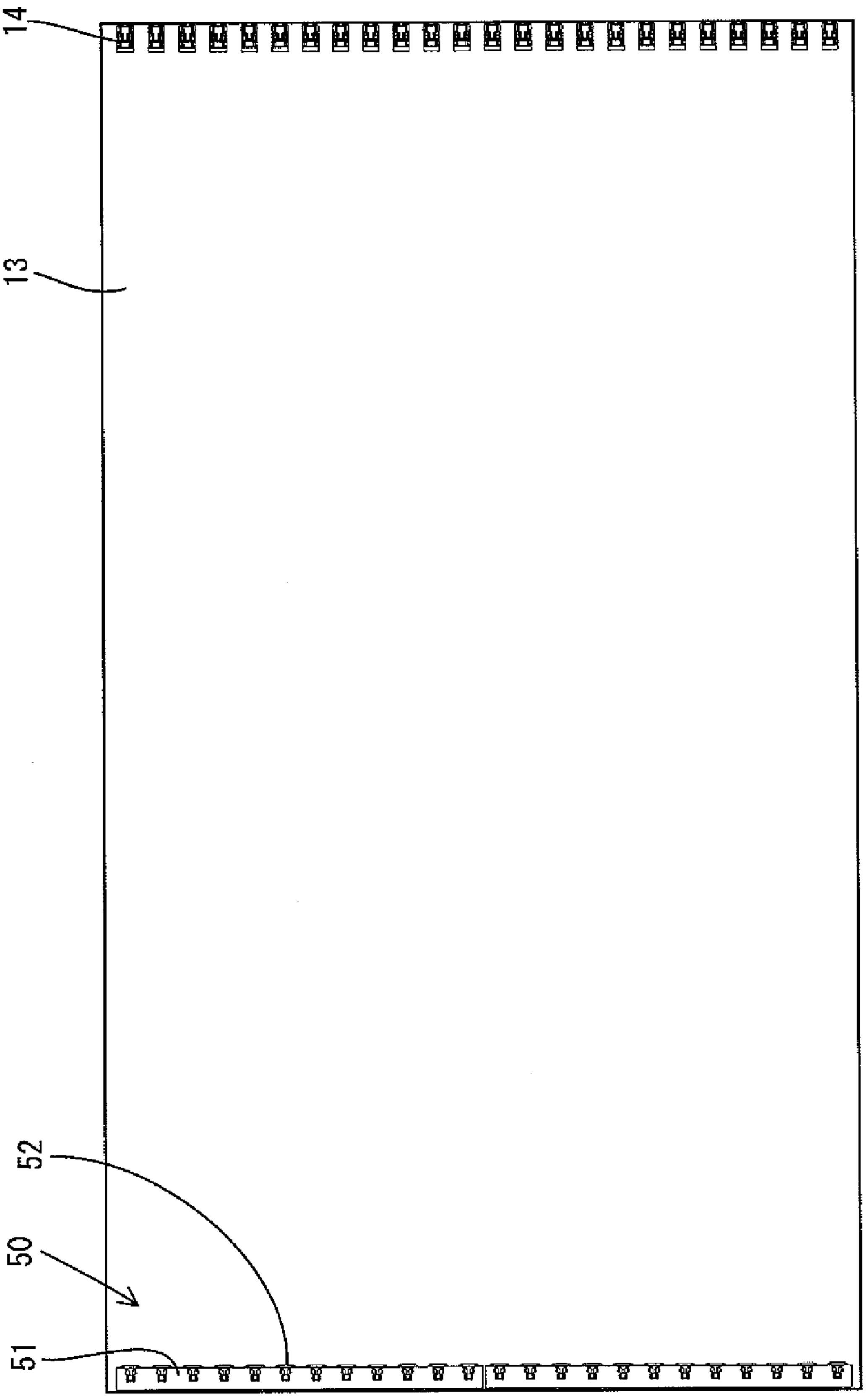
FIG. 16 is a front view showing the lighting device, from which discharge tubes are detached.
Figure 17:
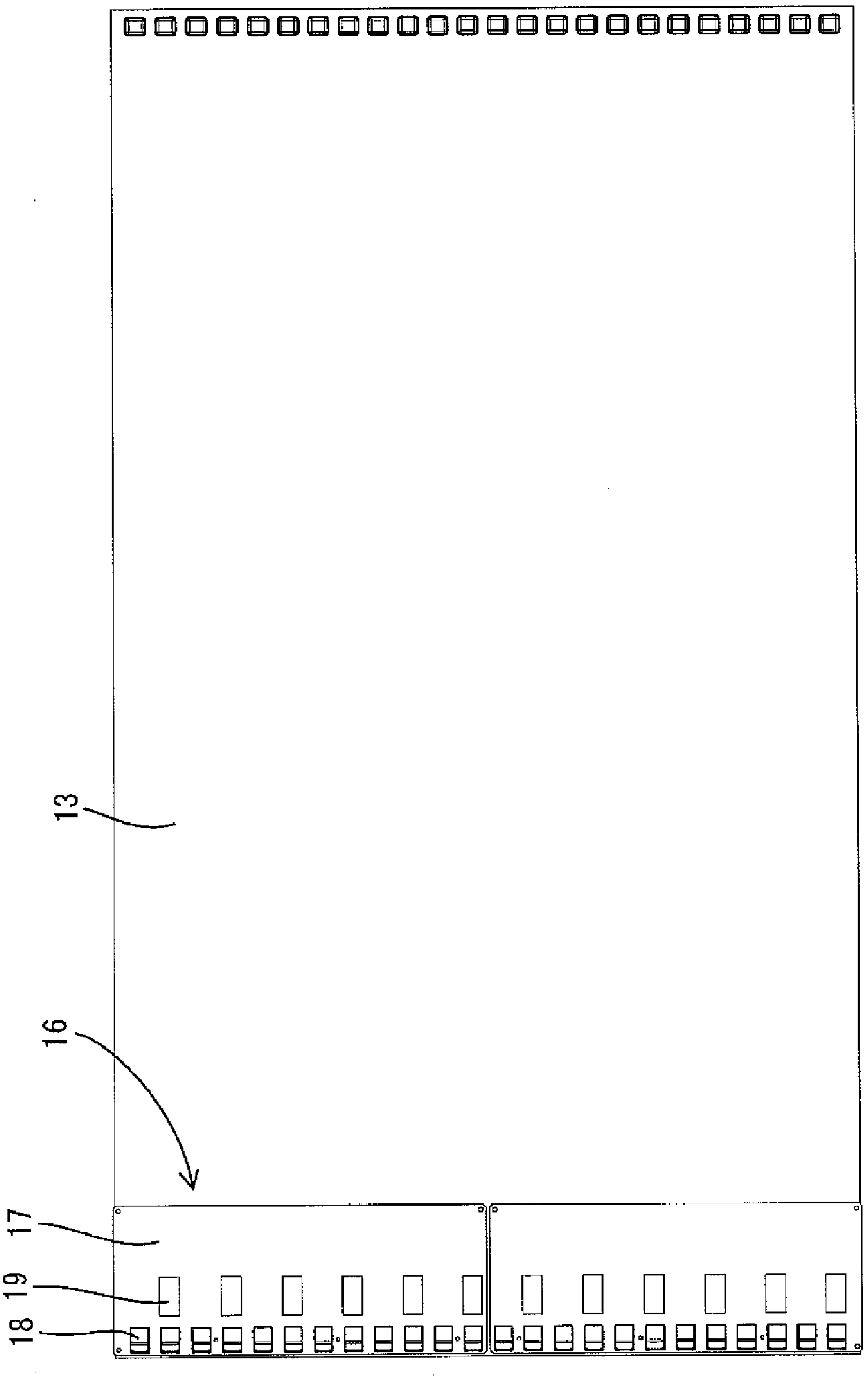
FIG. 17 is a rear view of the lighting device.
Figure 18:
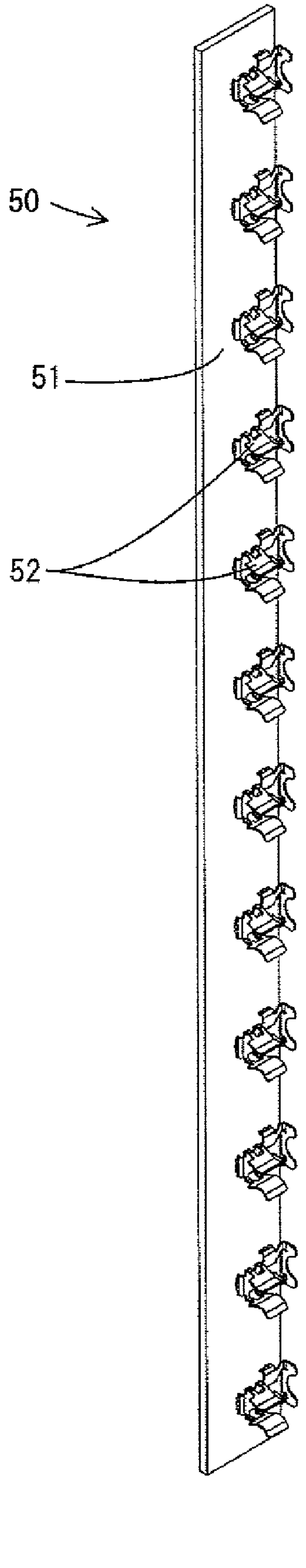
FIG. 18 is a perspective view of a grounding member.
Figure 19:
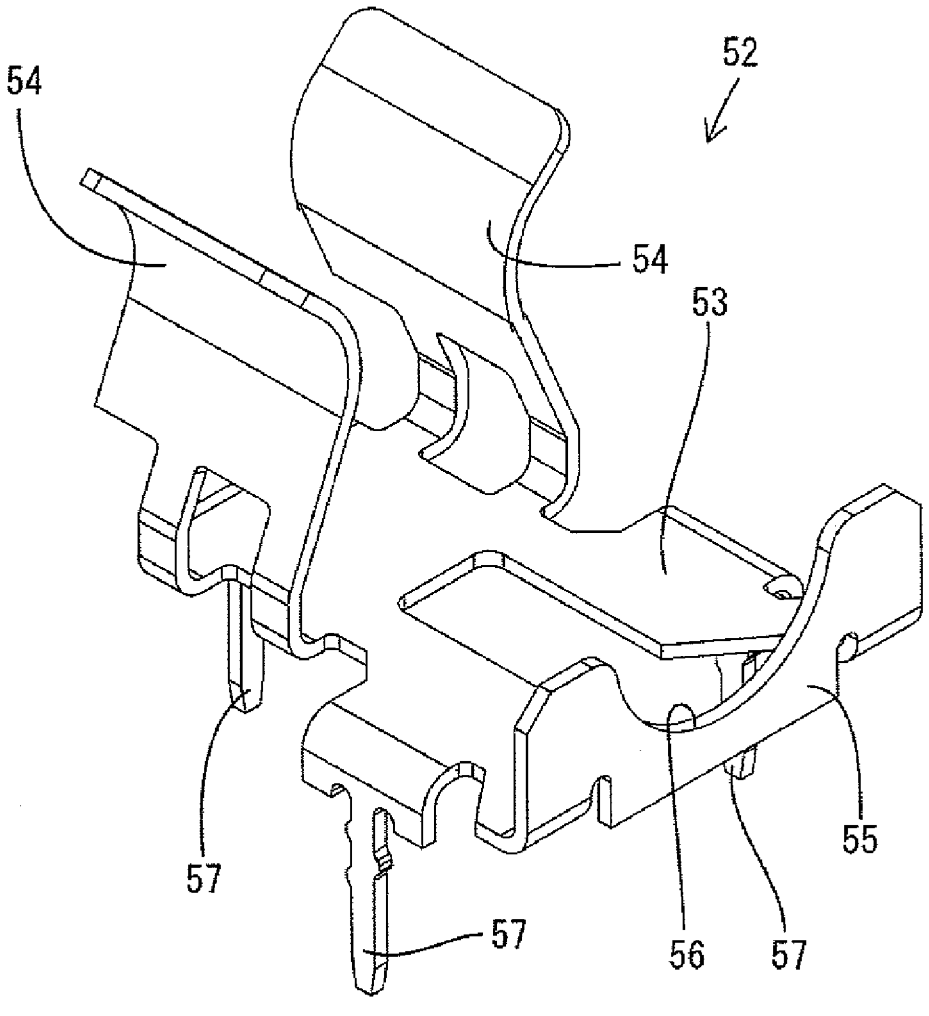
FIG. 19 is a perspective view of a grounding terminal.
Figure 20:
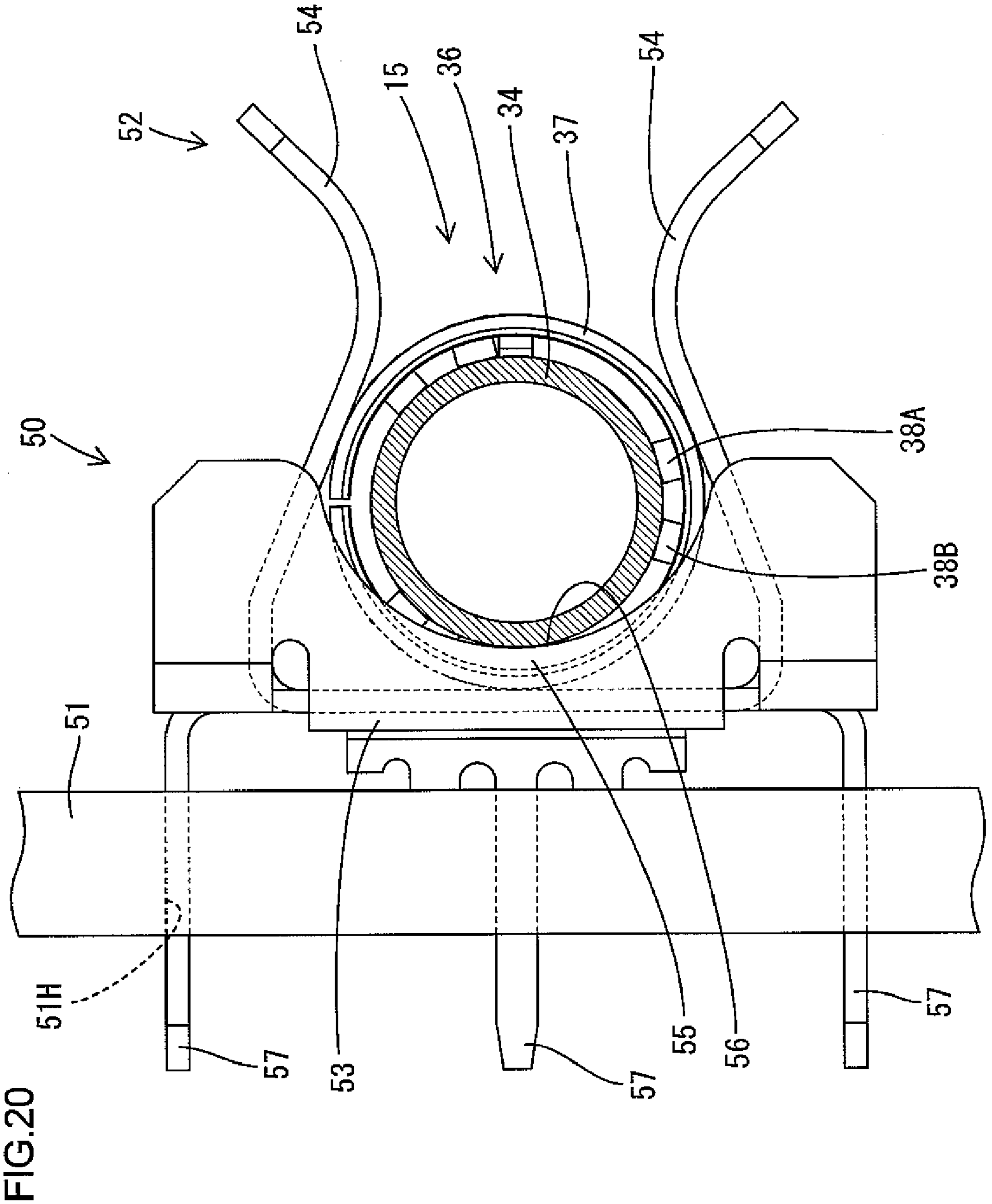
FIG. 20 is a sectional view showing that the ferrule of a discharge tube is capable of engaging with a stopper.
Figure 21:
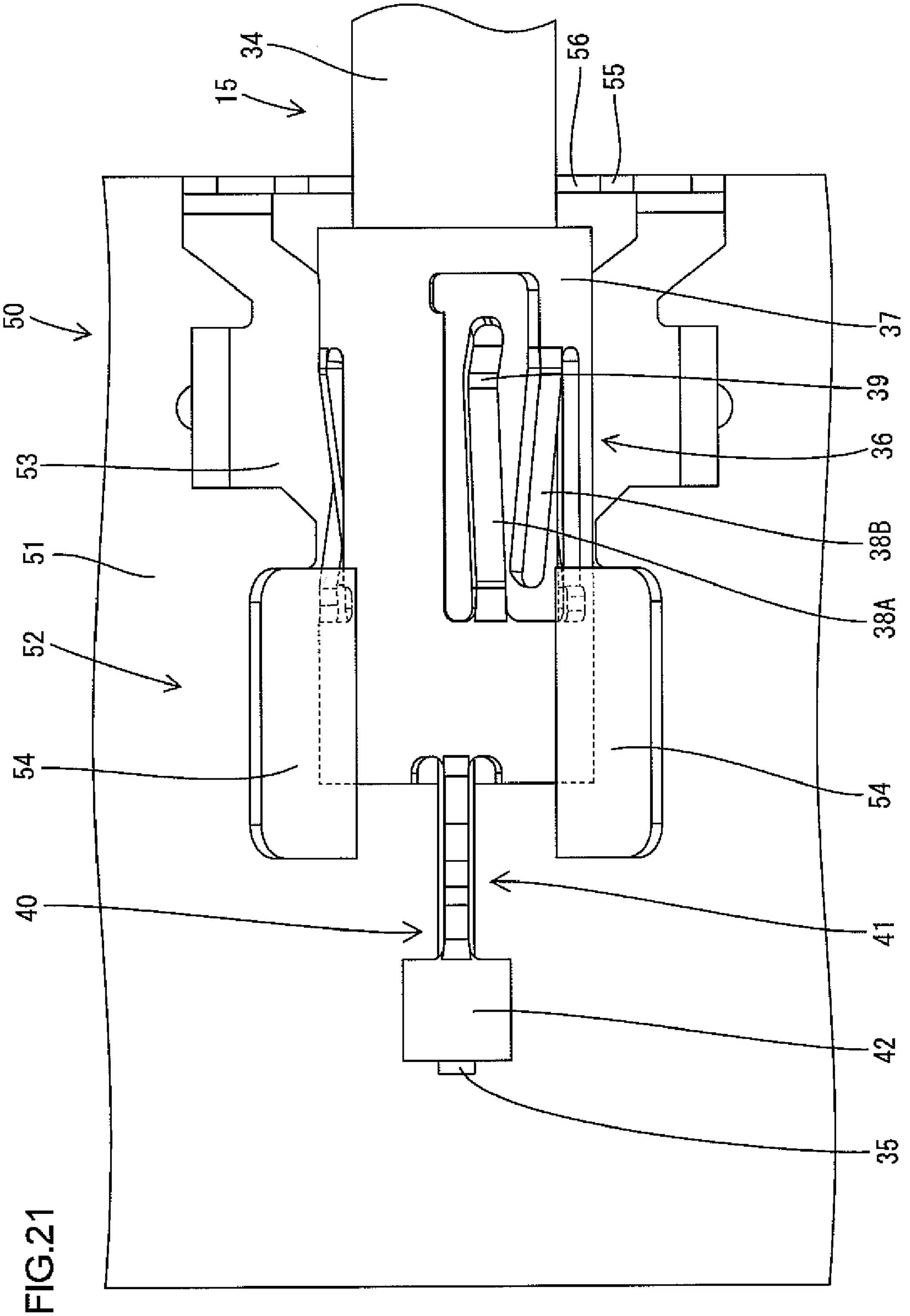
FIG. 21 is a partially-enlarged front view showing a connecting structure between a grounding terminal and a discharge tube.

A display device D is a so-called liquid crystal display device, which generally has a horizontally-elongated rectangular shape and includes a display panel 11 and a lighting device 10 as shown in FIG. 2. The display panel 11 is disposed on the front side of the lighting device 10, so that the lighting device 10 as a backlight can illuminate the display panel 11 from the back side. The display device D can be used in a television receiver, for example. As shown in FIG. 1, the television receiver includes the display device D, and front and back cabinets Ca and Cb capable of holding the display device D therebetween. Further included are a power source P other than a power board 16 (corresponding to a power source according to a preferred embodiment of the present invention) described below, a tuner T and a stand S. FIG. 2 schematically shows the display device D, and therefore the shapes of relay connectors 14 (corresponding to a supporting member of the present invention), on-board connectors 18 and the like differ slightly from those in the other figures.

The display panel 11 has a well-known construction, in which liquid crystal as a material with an optical property that changes with applied voltage is disposed in the gap between a transparent TFT substrate and a transparent CF substrate. TFTs (Thin Film Transistors), as switching elements connected to a source wiring line and a gate wiring line running at right angles to each other, and pixel electrodes connected to the TFTs are provided on the TFT substrate. A color filter, on which pixels of three primary colors, i.e., Red (R), Green (G)

and Blue (B), are arranged in a matrix, and a common electrode are provided on the CF substrate.

Overview of Lighting Device 10

The lighting device 10 includes a lamp unit 12 and power boards 16. The lamp unit 12 includes a metallic chassis 13, which generally has a horizontally-elongated rectangular plate configuration and functions as a reflector plate. Further included are a plurality of discharge tubes 15 held in a horizontal position and vertically arranged on the front side of the chassis 13 so as to be parallel or substantially parallel to one another, and a plurality of relay connectors 14 which are vertically arranged along the lateral edges of the chassis 13 so as to correspond to the discharge tubes 15. The power boards 16 are disposed on the back side of the chassis 13 so as to supply power to the discharge tubes 15 via the relay connectors 14.

A plurality of substantially rectangular mounting holes 13H corresponding to the ends of the discharge tubes 15 are formed through the chassis 13 so as to extend from the front side to the back side, and are vertically arranged to be level with the respective discharge tubes 15. The relay connectors 14 are mounted through the respective mounting holes 13H.

Relay Connector 14

Each relay connector 14 includes a holder 20 made of synthetic resin, and a relay terminal 31 (corresponding to a connecting terminal according to a preferred embodiment of the present invention) that is housed in the holder 20 and made of metal (e.g., stainless steel).

The holder 20 includes a box-shaped portion 21 that defines a block-shaped configuration as a whole, and further includes a wall portion 22 that projects backward from the back surface of the box-shaped portion 21.

A container room 23 is formed in the box-shaped portion 21, so as to have an opening extending from the front side to the lateral side (i.e., the lateral side on the opposite side of the lateral edge portion of the chassis 13). The front opening portion of the opening of the container room 23 is provided as a receiving opening 24, into which an end portion (or ferrule 36) of the discharge tube 15 is fitted from the front side. The lateral opening portion is provided as an escape opening 25 for preventing interference with the glass tube 34 when the end portion of the discharge tube 15 is held in the container room 23. A stopper 26 is formed on the escape opening 25, so as to bulge inward from the opening edge and define a plate-shape configuration. Due to the stopper 26, the escape opening 25 is narrowed so as to define a substantially U-shaped opening. The vertical size of the substantially U-shaped escape opening 25 is preferably set to be smaller than the inner diameter of the body 37 of the ferrule 36 and be equal to or slightly larger than the outer diameter of the glass tube 34 of the discharge tube 15. On the escape opening 25, a concave portion 27 having a semicircular shape is provided on the far end portion of the opening edge. The radius of curvature of the concave portion 27 is preferably set to be equal to or slightly larger than the radius of curvature of the outer circumference of the glass tube 34. On the escape opening 25, a pair of upper and lower guiding portions 28 are provided on areas of the opening edge on the front side of the concave portion 27.

On the box-shaped portion 21, an extended portion 29 extending parallel or substantially parallel to the chassis 13 is provided on the lateral surface of the box-shaped portion 21 that includes the escape opening 25. The extended portion 29 extends so as to separate the front surface of the chassis 13 from the escape opening 25. A pair of upper and lower retaining protrusions 30 are provided on the outer surface (i.e., upper surface and lower surface) of the box-shaped portion 21.

The relay terminal 31 is held within the holder 20. The relay terminal 31 can be formed by bending a metallic plate that is formed into a predetermined shape by punching. The relay terminal 31 includes a pair of vertically symmetrical elastic pressing portions 32 formed of curved plates, and further includes a board connecting portion 33 formed as a flat plate-shaped portion that projects to the back side. The pair of elastic pressing portions 32, which are housed in the container room 23, can deflect elastically and vertically so as to increase distance therebetween. The vertical distance between the pair of elastic pressing portions 32 is shortest at a position corresponding to the front side of the concave portion 27 of the stopper 26. The minimum distance between the elastic pressing portions 32, when the elastic pressing portions 32 are not forced into elastic deflection or are in a free state, is set to be smaller than the outer diameter of the body 37 of the ferrule 36 attached on the discharge tube 15. On the other hand, the board connecting portion 33 projects from the back surface of the box-shaped portion 21 so as to be exposed to the outside of the holder 20, and extends backwards along the wall portion 22.

When the relay connector 14 is mounted to the chassis 13, the wall portion 22 of the holder 20 is inserted into a mounting hole 13H from the front side of the chassis 13. Thereby, the outer surface of the box-shaped portion 21 comes in contact with the opening edge of the mounting hole 13H on the front surface of the chassis 13, while the retaining protrusions 30 are locked by the opening edge of the mounting hole 13H on the back surface of the chassis 13. Thus, the chassis 13 is sandwiched between the outer surface of the box-shaped portion 21 on the front side and the retaining protrusions 30 on the back side. Thereby, the holder 20 is fixed to the chassis 13 so that its movement in the mounting direction (i.e., the through direction of the mounting hole 13H) is restricted. Then, the mounting of the relay connector 14 to the chassis 13 is completed. When the relay connector 14 is attached to the chassis 13, the box-shaped portion 21 as the front end portion of the holder 20 projects (or is exposed) to the front side of the chassis 13 while the wall portion 22 as the back end portion of the holder 20 projects (or is exposed) to the back side of the chassis 13.

Discharge Tube 15

Each discharge tube 15 is formed of a cold cathode fluorescent tube that includes a generally elongated straight glass tube 34 having a circular cross section, and elongated metallic (e.g., nickel or cobalt metal) outer leads 35 which have a circular cross section and project linearly from the respective ends of the glass tube 34 and coaxially with the glass tube 34. Further included are ferrules 36 attached to the respective end portions of the glass tube 34. Mercury is encapsulated in the glass tube 34. Each end portion of the glass tube 34 is melted into a substantially hemispherical shape by heat, and thereby defines a domed portion. The outer lead 35 penetrates the domed portion.

Each ferrule 36 preferably is a single-piece component, which can be formed by bending or hammering a metallic (e.g., stainless steel) plate that is formed into a predetermined shape by punching. The ferrule 36 includes a body 37 and a conductive portion 40. The body 37 generally defines a cylindrical shape concentric with the glass tube 34. The inner diameter of the body 37 preferably is set to be slightly larger than the outer diameter of the glass tube 34.

Three pairs of elastic gripping portions 38A, 38B preferably are formed on the body 37 by making slit-shaped cuts in portions thereof, which are arranged at even angular intervals along the circumferential direction.

A first elastic gripping portion 38A, i.e., one of a pair of elastic gripping portions 38A, 38B, is generally formed as a cantilevered portion extending posteriorly (specifically, in an oblique direction slightly leaning radially inwardly), which is capable of elastic and radial deflection with a supported point on its proximal end (or anterior end). A curved portion 39 is provided on the distal end portion (or posterior end portion) of the first elastic gripping portion 38A, so as to curve in an oblique direction leaning radially outwardly. The outer surface of the curve (or inwardly facing surface) of the curved portion 39 is provided as a contact point when abutting on the outer circumferential surface of the glass tube 34. The imaginary line that connects the contact points provided on the three first elastic pressing portions 38A forms a circle concentric with the body 37. The diameter of the imaginary circle, when the first elastic gripping portions 38A are not forced into elastic deflection or are in a free state, is set to be smaller than the outer diameter of the glass tube 34.

A second elastic gripping portion 38B, i.e., the other of the pair of elastic gripping portions 38A, 38B, is arranged circumferentially adjacent to the first elastic gripping portion 38A, and is generally formed as a cantilevered portion extending anteriorly or reversely from the first elastic gripping portion 38A (specifically, in an oblique direction slightly leaning radially inwardly), which is capable of elastic and radial deflection with a supported point on its proximal end (or posterior end). The distal end of the second elastic gripping portion 38B is provided as a contact point when abutting on the outer circumferential surface of the glass tube 34. The imaginary line that connects the contact points provided on the three second elastic gripping portions 38B forms a circle concentric with the body 37. The diameter of the imaginary circle, when the second elastic gripping portions 38B are not forced into elastic deflection or are in a free state, is preferably set to be smaller than the outer diameter of the glass tube 34.

On the body 37, a pair of protector portions are formed as cantilevered portions protruding anteriorly from the anterior end edge thereof. The pair of protector portions are arranged circumferentially spaced apart, and extend linearly from the body 37 so as to be flush therewith. The conductive portion 40 is provided as a cantilevered portion that extends anteriorly from between the pair of protector portions. The conductive portion 40 includes a long portion 41 continuous with the anterior end of the body 37, and a cylindrical portion 42 that further projects anteriorly from the anterior end (or distal end) of the long portion 41.

The long portion 41 includes a proximal portion 41*a* that extends from the body 37 so as to be flush with the body 37 and parallel or substantially parallel to the axis thereof, and further includes an intermediate portion 41*b* that extends radially inwardly from the distal end of the proximal portion 41*a* toward the axis of the body 37. Further included is a distal portion 41*c* that extends from the distal end of the intermediate portion 41*b* and parallel or substantially parallel to the axis of the body 37. The cylindrical portion 42 is connected to the distal end of the distal portion 41*c*. The width of the long portion 41 is set to be sufficiently small for the length of the long portion 41. Therefore, the long portion 41 is capable of elastic deformation in the radial direction of the body 37, elastic deformation in a direction intersecting with the radial direction (and intersecting with the longitudinal direction of the long portion 41), and elastic torsional deformation around the long portion 41 itself as the axis.

The cylindrical portion 42, which can be formed by bending a portion laterally extending from the distal end of the long portion 41 into a cylindrical shape, is arranged substantially coaxially with the body 37. The cylindrical portion 42 is capable of displacement around the axis of the ferrule 36 and radial displacement, due to elastic deflection of the long portion 41.

Attachment of Ferrule 36 to Glass Tube 34

Next, an assembling process for attaching a ferrule 36 to a glass tube 34 will be explained.

During the assembling process, while a ferrule 36 and a glass tube 34 are held by respective holding devices (not shown), the ferrule 36 and the glass tube 34 are moved relatively and coaxially so as to approach each other. Thereby, the body 37 is fitted onto the glass tube 34. When the body 37 begins engagement, the contact points provided on the distal end portions of the three pairs of elastic gripping portions 38A, 38B have elastic contact with the outer circumference of the glass tube 34. The contact points slide on the outer circumferential surface of the glass tube 34, as the assembling process proceeds. Then, the tip of the outer lead 35 having passed through the body 37 begins to enter the hollow of the cylindrical portion 42. When both of the holding devices have thereafter reached predetermined final positions, the ferrule 36 and the glass tube 34 are axially positioned in proper positions, resulting in the tip end portion of the outer lead 35 being circumferentially surrounded by the cylindrical portion 42. At the time, the tip end portion of the outer lead 35 will not greatly protrude from the anterior end of the cylindrical portion 42. That is, it slightly protrudes out of the cylindrical portion 42, or is aligned with the anterior end of the cylindrical portion 42, or alternatively it is located within the cylindrical portion 42.

Thereafter, the cylindrical portion 42 is clamped so as to deform with diameter reduction. After being clamped, the cylindrical portion 42 is electrically conductively fixed to the outer lead 35 by welding, and consequently the ferrule 36 is integrated with the glass tube 34. Then, the assembling process terminates, and the discharge tube 15 is completed.

When the ferrule 36 is attached to the glass tube 34, the body 37 is concentrically held on the glass tube 34 due to the elastic holding function of the three pairs of elastic gripping portions 38A, 38B. A gap (airspace) is secured between the outer circumference of the glass tube 34 and the inner circumference of the body 37, so as to extend over the substantially entire circumference.

Figure 22:
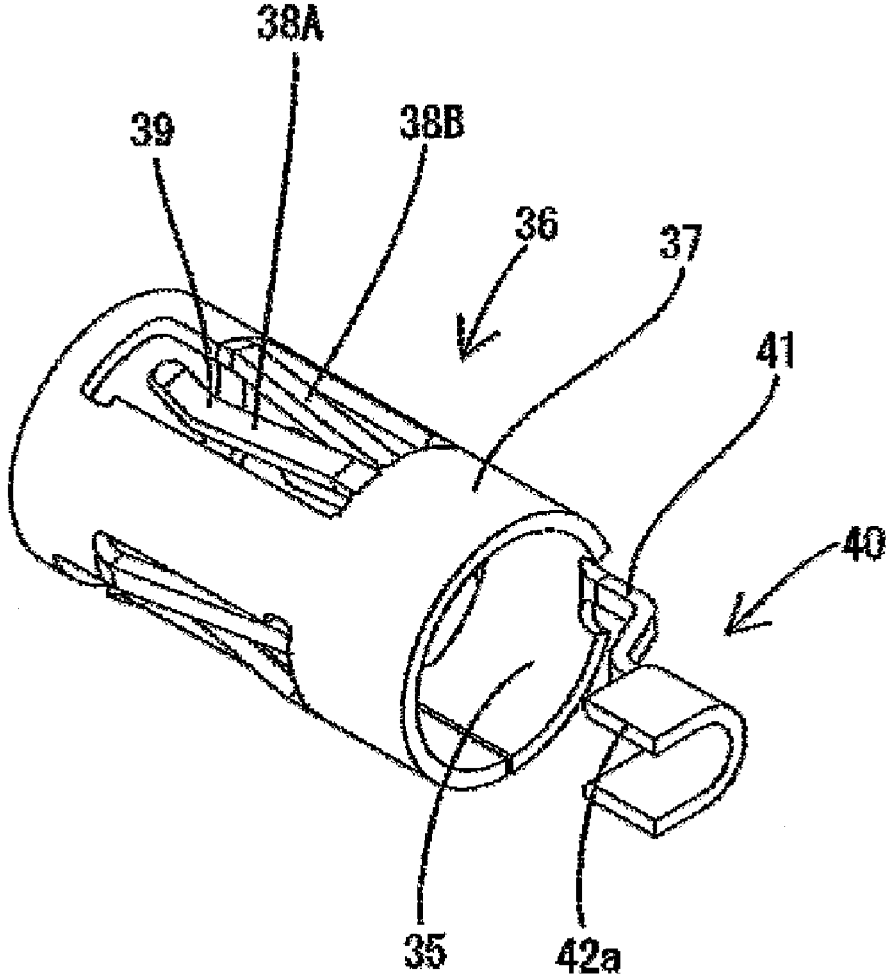
FIG. 22 is a perspective view showing a modification of a ferrule.
Figure 23:
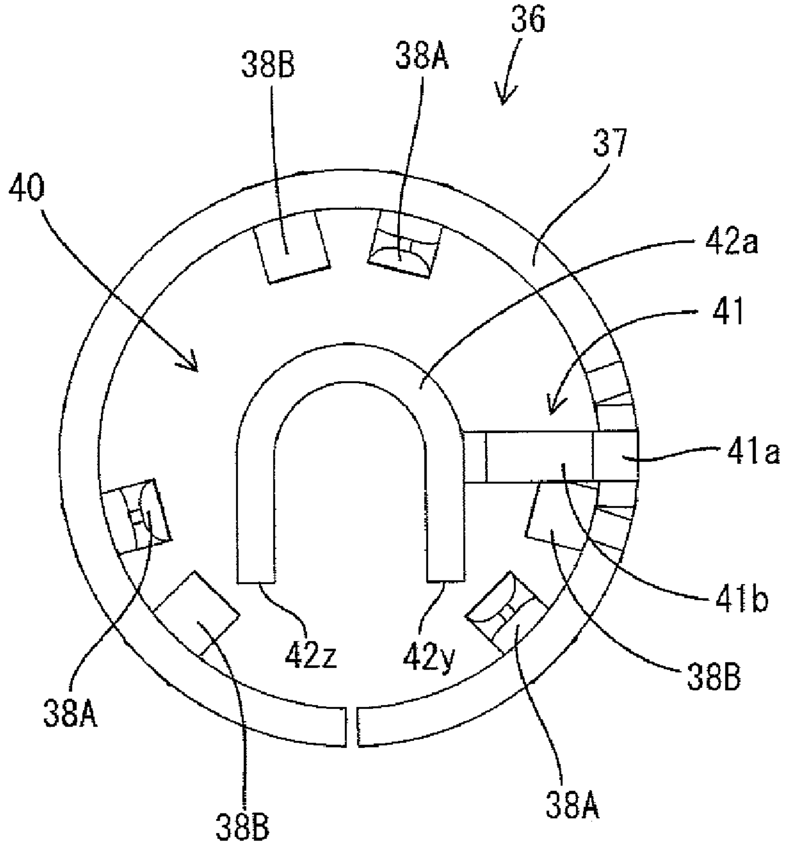
FIG. 23 is a side view of FIG. 22.

Instead of the cylindrical portion 42, a U-shaped connecting portion 42*a* may be provided as shown in FIGS. 22 and 23. In this case, after a glass tube 34 is fitted into a ferrule 36, the U-shaped connecting portion 42*a* is bended so as to hug the outer lead 35, in order to achieve electrical connection between the outer lead 35 and the connecting portion 42*a*. According to the preferred embodiment thus including the bendable U-shaped connecting portion 42*a*, electrical connectivity with the outer lead 35 can be further improved.

Mounting of Discharge Tube 15 to Relay Connectors 14

The discharge tube 15, thus assembled, is fixed to relay connectors 14. At the time of fixation, the discharge tube 15 held in a horizontal position is moved toward the front surface of the chassis 13, and the end portions and the ferrules 36 of the glass tube 34 are fitted into the container rooms 23 of the relay connectors 14 from the front side. At the time, the pair of elastic pressing portions 32 are pushed by the body 37 of the ferrule 36 so as to open vertically due to elastic deflection. After the body 37 has passed through the shortest-distance portions of the pair of elastic pressing portions 32, the body 37 is pulled deep into the container room 23 due to elastic restoring forces of the elastic pressing portions 32, resulting in the body 37 abutting on the bottom of the container room 23. Then, the mounting of the discharge tube 15 is completed.

The discharge tube 15 thus mounted is held by the pairs of elastic pressing portions 32 at its end portions, and consequently is fixed to the chassis 13 via the relay terminals 31 and the holders 20 provided as the relay terminal 31 mounting bases. At the time, the weight of the discharge tube 15 is received solely by the chassis 13 via the relay connectors 14. That is, the outer leads 35 will not be under load due to the weight of the discharge tube 15.

The pair of elastic pressing portions 32 can have elastic contact with the outer circumferential surface of the body 37, and thereby the outer lead 35 is electrically conductively connected to the relay terminal 31 via the ferrule 36. Further, the glass tube 34 is held due to elastic restoring forces of the pair of elastic pressing portions 32, so as to be pressed against the concave portion 27 of the stopper 26. Therefore, when viewed along the axial direction of the discharge tube 15, the body 37 appears to be positioned so as to partially overlap with the stopper 26. That is, the end edge of the body 37 on the opposite side of the conductive portion 40 is axially positioned in proximity to the stopper 26 so as to be partially faced therewith.

The extended portion 29 is formed on the outer surface of the holder 20, which is perpendicular to the surface of the chassis 13 and includes the escape opening 25 of the container room 23, so as to protrude from between the chassis 13 and the escape opening 25 and extend along the surface of the chassis 13. This results in a long creepage distance from the inside of the container room 23 to the front surface of the chassis 13. Thereby, a leak, from the discharge tube 15 held in the container room 23 to the chassis 13 outside the holder 20, can be prevented.

Overview of Power Board 16

Each power board 16 includes a circuit board 17 having a circuit located on its back surface (i.e., the surface on the opposite side of the chassis 13), electronic components 19 mounted on the back surface of the circuit board 17, and a plurality of on-board connectors 18 mounted on the back surface of the circuit board 17.

The circuit board 17 preferably has a vertically-elongated rectangular shape as a whole, and is formed using a phenolic paper-base copper-clad laminated board (known as a phenolic paper). A plurality of fitting holes 17H having a vertically-elongated rectangular shape are formed through the circuit board 17 so as to extend from the front side to the back side. The plurality of fitting holes 17H are arranged vertically along the lateral side edge of the circuit board 17 so as to correspond to the above-described relay terminals 31 (or relay connectors 14). Each on-board connector 18 includes a housing made of synthetic resin, and an output terminal (not shown) that is completely contained in the housing and made of metal (e.g., nickel silver). The on-board connectors 18 are arranged along the lateral side edge of the circuit board 17 so as to correspond to the respective fitting holes 17H. A fitting space (not shown) is formed on the outer surface of the housing so as to correspond to the fitting hole 17H, and the output terminal is partly exposed to the fitting space.

While the circuit board 17 is kept parallel or substantially parallel to the chassis 13, the power board 16 is moved toward the chassis 13 from the back side and is fixed thereto. At the time of fixation, the wall portions 22 of the relay connectors 14 and the board connecting portions 33 arranged along the wall portions 22 penetrate the circuit board 17 through the fitting holes 17H and are inserted into the engaging recesses 27 of the on-board connectors 18. Thereby, the on-board connectors 18 are fitted onto the relay connectors 14, and the output terminals are conductively connected to the relay terminals 31.

Operational Effects of the Present Preferred Embodiment

In the present preferred embodiment, when a discharge tube 15 is supported on relay connectors 14, the stoppers 26 lock the ferrules 36. Therefore, the discharge tube 15 is secure from axial movement relative to the relay connectors 14. That is, if a force is applied to the discharge tube 15 so as to cause movement to the right, the stopper 26 catches the left-adjacent ferrule 36 attached on the left end portion of the discharge tube 15 so that the movement of the discharge tube 15 to the right is restricted. If a force is applied to the discharge tube 15 so as to cause movement to the left, the stopper 26 catches the right-adjacent ferrule 36 attached on the right end portion of the discharge tube 15 so that the movement of the discharge tube 15 to the left is restricted. Thus, the axial movement of the discharge tube 15 to either right or left is restricted, and therefore the tip of the outer lead 35 is secure from hitting the wall 22 of the container room 23 on the opposite side of the escape opening 25.

The stopper 26 can engage with and lock the end edge of the ferrule 36, and therefore a hole that can engage with the stopper 26 is not required to be formed on the outer circumference of the ferrule 36. Thereby, processing cost can be reduced, and reduction in strength of the ferrule 36 can be prevented.

In the case of a construction in which a stopper 26 can engage with the end edge of a ferrule 36 on the side of the conductive portion 40, the conductive portion 40 extending from the end edge of the ferrule 36 may preclude the end edge of the ferrule 36 from engaging with the stopper 26, when the ferrule 36 is attached at some angle about its axis. However, in the present preferred embodiment 1, the stopper 26 is preferably arranged to engage with the end edge on the opposite side of the conductive portion 40. Therefore, the conductive portion 40 will not preclude the ferrule 36 from engaging with the stopper 26, and consequently the ferrule 36 can infallibly engage with the stopper 26.

The conductive portion 40 includes a cylindrical portion 42, which can be circumferentially connected to the outer lead 35 so as to surround it. Thereby, the conductive portion 40 can be prevented from disengaging from the outer lead 35. That is, the cylindrical portion 42 will not disengage from the outer lead 35 when the cylindrical portion 42 is clamped. Therefore, the conductive portion 40 can be infallibly connected to the outer lead 35.

The margin for engagement of a ferrule 36 with a stopper 26 corresponds to the dimensional difference between the outer diameters of the glass tube 34 and the ferrule 36. In the present preferred embodiment, ferrules 36 are concentrically held on a glass tube 34 due to the elastic gripping portions 38A, 38B. Therefore, if the ferrule 36 is set to be large, a large dimensional difference can be secured between the inner diameter thereof and the outer diameter of the glass tube 34. Thereby, the margin for engagement of the ferrule 36 with the stopper 26 can be increased, resulting in reliable restriction of movement of the discharge tube 15.

The concave portion 27 is formed on a stopper 26, so as to abut on or be located close to the outer circumference of a glass tube 34 when the ferrule 36 engages with the stopper 26. Further, the pair of elastic pressing portions 32 capable of pressing the discharge tube 15 toward the concave portion 27 side are provided in the relay connector 14. Specifically, the pair of elastic pressing portions 32 press the discharge tube 15 toward the concave portion side, obliquely from above and obliquely from below, i.e., vertically symmetrically. Thereby, the glass tube 34 is prevented from disengaging from the concave portion 27, and therefore the engagement of the ferrule 36 with the stopper 26 can be reliably maintained.

The relay connector 14 is preferably formed by mounting a relay terminal 31 in a holder 20 made of synthetic resin. In the present preferred embodiment 1, the stopper 26 is formed on the synthetic-resin holder 20. Therefore, a stopper is not required to be formed on the relay terminal 31, and thereby the material for manufacturing the relay terminals 31 can be reduced. Considering that the material cost for synthetic resin is generally lower than that for metal, the material cost for relay connectors 14 can be reduced according to the present preferred embodiment.

Preferred Embodiment 2

Next, preferred embodiment 2 of the present invention will be explained with reference to FIGS. 15 to 21. In the present preferred embodiment 2, the construction of the components arranged to support a discharge tube 15 differ from those of the above preferred embodiment 1. The other constructions are similar to the above preferred embodiment 1. Therefore, the same constructions are designated by the same symbols, and explanations for the constructions, operations and effects thereof are omitted.

Overview of Grounding Member 50

In the above preferred embodiment 1, the end portions of a discharge tube 15 are preferably supported by relay connectors 14, each of which includes a holder 20 and a relay terminal 31. In the present preferred embodiment 2, one of the end portions of a discharge tube 15 is supported by the same relay connector 14 as the preferred embodiment 1, while the other end portion of the discharge tube 15 is supported by a grounding member 50 (corresponding to a supporting member according to a preferred embodiment of the present invention).

The grounding member 50 includes an elongated support plate 51 fixed to the chassis 13 so as to be along one of the lateral edge portions thereof, and further includes a plurality of grounding terminals 52 (corresponding to a connecting terminal according to a preferred embodiment of the present invention) conductively mounted on the front surface of the support plate 51. Mounting holes 51H are formed through the support plate 51 so as to correspond three-to-one with the grounding terminals 52. The support plate 51 is preferably formed of a substrate or a metallic plate.

On the other hand, each grounding terminal 52, which can be formed by bending a metallic (e.g., nickel silver) plate that is formed into a predetermined shape by punching, includes a base portion 53 and a pair of elastic pressing portions 54 which extend vertically symmetrically from the respective upper and lower edge portions of the base portion 53 to the front side. Further included is a stopper 55 that extends from one of the lateral edge portions of the base portion 53 to the front side.

The pair of elastic pressing portions 54 are provided on the lateral edge portion on the opposite side of the stopper 55, so as to form bulging curves toward each other. The elastic pressing portions 54 are capable of elastic deflection so as to increase the distance therebetween. The minimum distance between the pair of elastic pressing portions 54, when the elastic pressing portions 54 are free from elastic deflection, is set to be smaller than the outer diameter of the glass tube 34 of a discharge tube 15.

The stopper 55 is raised from the base portion 53, so as to form a right angle with the axis of the discharge tube 15. A concave portion 56 is formed on the stopper 55, so as to sag in a substantially circular arc. On a relay connector 14 of the preferred embodiment 1, a pair of guiding portions 28 rise up from the respective upper and lower sides of the concave portion 27 of the stopper 26. However, in the present preferred embodiment 2, the heights of portions rising up from the respective upper and lower sides of the concave portion 56 of the base portion 53 are reduced to be short. That is, elements corresponding the guiding portions 28 of the preferred embodiment are not provided. Therefore, metallic material required for grounding terminals 52 can be reduced, compared to including guiding portions.

Three leg portions 57 are further formed on the base portion 53, so as to be integrated therewith. Two of the three leg portions 57 are provided between the elastic pressing portions 54 and the stopper 55, so as to project from the respective upper and lower edge portions of the base portion 53 to the opposite side of the elastic pressing portions 54 or the stopper 55 (i.e., to the back side). The remaining one of the leg portions 57 is provided on the lateral edge of the base portion 53 on the opposite side of the stopper 55, so as to project from the intermediate position between the elastic pressing portions 54 to the opposite side of the elastic pressing portions 54 or the stopper 55 (i.e., to the back side).

The grounding terminal 52 is not housed in a member such as a plastic housing, i.e., barely provided, and is conductively fixed to the support plate 51 by soldering or the like so that its leg portions 57 penetrate through the mounting holes 51H. Thus, the plurality of grounding terminals 52 are mounted to the common support plate 51, and thereby are conductively connected to one another via the support plate 51. Power boards are not connected to the grounding members 50, and the support plate 51 is conductively connected to the chassis.

Mounting of Discharge Tube 15 to Grounding Terminal 52

When a discharge tube 15 is fixed to a grounding terminal 52, the discharge tube 15 held in a horizontal position is moved toward the front surface of the chassis 13, and the end portion and the ferrule 36 of the glass tube 34 are fitted between the pair of upper and lower elastic pressing portions 54 from the front side. At the time, the pair of elastic pressing portions 54 are pushed by the body 37 of the ferrule 36 so as to open vertically due to elastic deflection. After the body 37 has passed through the shortest-distance portions of the pair of elastic pressing portions 54, the body 37 is pulled toward the base portion 53 side due to elastic restoring forces of the elastic pressing portions 54, resulting in the body 37 abutting on the base portion 53. Then, the fixation of the discharge tube 15 is completed. The other end portion of the discharge tube 15 is fixed to a relay connector 14 in a similar manner to the above preferred embodiment 1.

The discharge tube 15 thus mounted is supported by the relay connector 14 and the grounding member 50 at its respective end portions. The pairs of elastic pressing portions 32, 54 can have elastic contact with the outer circumferential surfaces of the bodies 37 of the ferrules 36, and thereby the outer leads 35 are electrically conductively connected to the relay terminal 31 and the grounding terminal 52 via the ferrules 36. Further, the glass tube 34 is held due to elastic restoring forces of the pairs of elastic pressing portions 54, so as to be pressed against the concave portions 27, 56 of the stoppers 26, 55. Therefore, when viewed along the axial direction of the discharge tube 15, the body 37 appears to be positioned so as to partially overlap with the stopper 26 or 55. That is, the end edge of the body 37 on the opposite side of the conductive portion 40 is axially positioned in proximity to the stopper 26 or 55 so as to be partially faced therewith.

Figure 24:
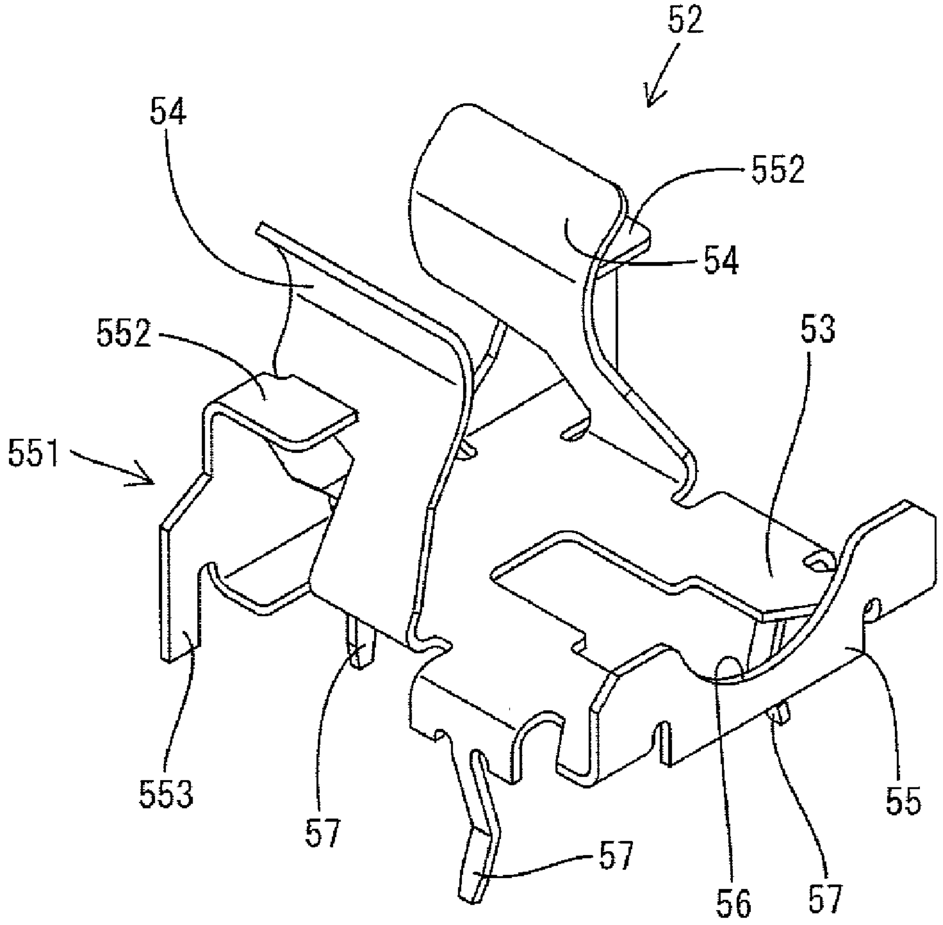
FIG. 24 is a perspective view of a grounding terminal.
Figure 25:
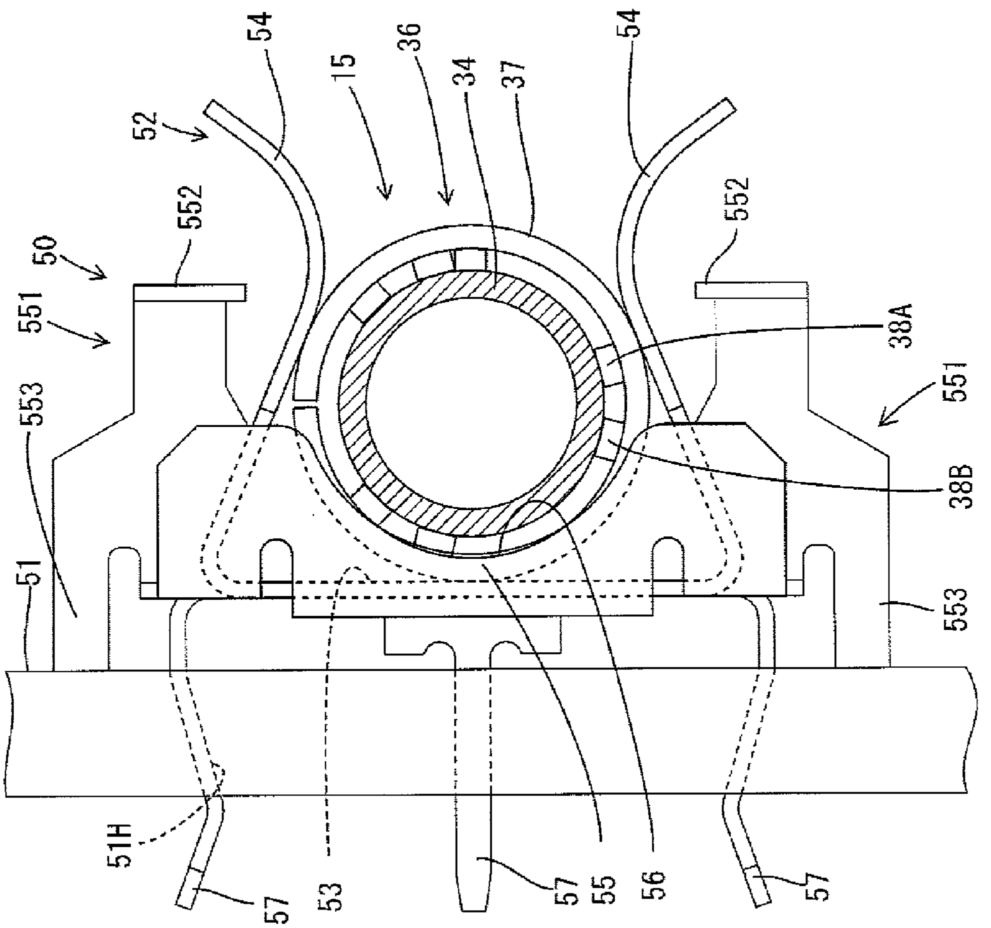
FIG. 25 is a sectional view showing a connection between a grounding terminal shown in FIG. 24 and a ferrule.

As shown in FIGS. 24 and 25, protector portions 551 may be provided on the grounding terminal 52. Each protector portion 551 includes a restricting portion 552 for an elastic pressing portion, and further includes an abutting portion 553 for abutting on the support plate. When the grounding terminal 52 is mounted and fixed to the support plate 51, the abutting portions 553 abut on or are located close to the support plate 51. If some kind of external force is applied to the elastic pressing portions 54 so that they are pushed to open, they first come in contact with the restricting portions 553 during the course of opening. The abutting portions 553 serve as supports for preventing the protector portions 551 from collapsing, when an additional load is thereafter applied. The protector portions 551 are connected to the feet of the elastic pressing portions 54, and therefore the abutting portions 553 should be formed lateral to the connection portion in order that the abutting portions 553 work. Note that abutting portions 553 located at a longer distance from the connection portion are more effective.

Operational Effects of the Present Preferred Embodiment

In the present preferred embodiment 2, when a discharge tube 15 is supported on a relay connector 14 and a grounding member 50, the stopper 26 of the holder 20 and the stopper 55 of the grounding terminal 52 lock the ferrules 36 on the respective ends of the discharge tube 15. Therefore, the discharge tube 15 is secure from axial movement relative to the relay connector 14.

That is, if a force is applied to the discharge tube 15 so as to cause movement from the relay connector 14 side to the grounding member 50 side, the ferrule 36 attached on the end portion of the discharge tube 15 on the relay connector 14 side is caught by the stopper 26 of the holder 20 so that the movement of the discharge tube 15 to the grounding member 50 side is restricted. If a force is applied to the discharge tube 15 so as to cause movement from the grounding member 50 side to the relay connector 14 side, the ferrule 36 attached on the end portion of the discharge tube 15 on the grounding member 50 side is caught by the stopper 55 of the grounding terminal 52 so that the movement of the discharge tube 15 to the relay connector 14 side is restricted. Thus, the axial movement of the discharge tube 15 to either right or left is restricted, and therefore the tip of the outer lead 35 is securely prevented from hitting the wall of the container room 23 on the opposite side of the escape opening 25 or hitting the sidewall of the chassis 13.

The concave portion 56 is formed on the stopper 55 of a grounding terminal 50, so as to abut on or be located close to the outer circumference of a glass tube 34 when the ferrule 36 is in engagement with the stopper 55. Further, the pair of elastic pressing portions 54 capable of pressing the discharge tube 15 toward the concave portion 56 side are provided on the grounding terminal 52. Specifically, the pair of elastic pressing portions 54 press the discharge tube 15 toward the concave portion 56 side, obliquely from above and obliquely from below, i.e., vertically symmetrically. Thereby, the glass tube 34 is prevented from disengaging from the concave portion 56, and therefore the engagement of the ferrule 3 with the stopper 55 can be reliably maintained.

On the grounding member 50, the stoppers 55 are integrated with the respective grounding terminals 52 provided as a structure to provide conductive connection to the ferrules 36. Thereby, the number of components can be reduced in the present preferred embodiment 2, compared to including stoppers provided as separate members from the grounding terminals.

Other Preferred Embodiments

The present invention is not limited to the preferred embodiments described above. The following preferred embodiments may be included in the technical scope of the present invention, for example.

The engagement of a ferrule with a stopper is not limited to being formed at an axial end edge of the ferrule. An engaging portion for engagement with the stopper may be formed on the ferrule so as to be axially positioned at substantially the center of the ferrule.

Stoppers may be arranged so that two of the stoppers can engage with one ferrule. In this case, the axially spaced stoppers can lock the ferrule so as to hold the ferrule therebetween. According to the construction, it is only necessary to provide stoppers for engagement with the ferrule attached on one of the end portions of each discharge tube. However, stoppers for engagement with the ferrules attached on both end portions of each discharge tube may be provided, so that two of the stoppers can engage with each ferrule.

The stopper and the ferrule maybe arranged along the axial direction so that the stopper on the axial end side locks the ferrule on the central side.

The stopper is not limited to being formed into a circumferentially continuous circular arc, but rather may be formed of a plurality of circumferentially spaced portions.

The elastic gripping portions may be eliminated from a ferrule, so that the ferrule itself has elastic contact with the outer diameter of a glass tube when attached on the glass tube. In this case, the margin for engagement of the ferrule with a stopper corresponds to the plate thickness of the ferrule.

The radius of curvature of the concave portion of a stopper is not limited to being substantially equal to the radius of curvature of the outer circumference of the glass tube of a discharge tube. It may be set to be larger than the radius of curvature of the outer circumference of the glass tube.

A single elastic pressing portion may be provided, so as to be arranged across a discharge tube from the concave portion.

The elastic pressing portions may be arranged to abut on the glass tube of a discharge tube, instead of abutting on the ferrule. In this case, a member that is arranged to make conductive contact with the ferrule will preferably be provided separately from the elastic pressing portions.

The concave portion is not limited to being formed into a circular arc, but rather may be formed into a non-circular shape such as elliptical, trapezoidal or triangular shape.

The stopper may be formed on the connecting member mounted to a holder, instead of being formed on the holder.

The connecting portion provided on a conductive portion for connection to an outer lead is not limited to being formed into a cylindrical shape circumferentially surrounding the outer lead, but rather may be substantially U-shaped or V-shaped. Alternatively, a plate-shaped distal end portion may be provided on the conductive portion so as to have contact with the outer periphery of the outer lead. In this case, a valley, into which the outer lead is fitted, maybe formed on the plate-shaped distal end portion of the conductive portion.

The display panel of the display device is not limited to having TFTs as switching elements, but rather may include, as switching elements, elements other than TFTs such as MIM (Metal Insulator Metal) elements.

The display device is not limited to a liquid crystal display device. Various display devices requiring alighting device on the back side of a display panel can be included.

The connecting portion provided on a relay connector for connection to a power board is not limited to being formed as a protrusion, but rather may be formed as a recess. In this case, the connecting portions provided on the power board for connection to relay connectors should be formed as protrusions.

The power source is not limited to a power board that includes electronic components mounted on a circuit board, but rather maybe provided by connecting electronic components by wires without using a circuit board.

The on-board connectors may be eliminated from a circuit board, so that relay connectors are connected to the power source (or power board) via cables.

The on-board connectors of the power source maybe mounted on the chassis-side surface or front surface of the circuit board.

A metallic material other than stainless steel maybe used for ferrules. Alternatively, a nonmetallic material, such as a conductive resin or a conductive rubber, may be used instead.

The outer leads, linearly projecting from a glass tube, are not limited to being arranged concentrically with the glass tube, but rather may be arranged radially eccentrically with respect to the axis of the glass tube.

The outer leads, linearly projecting from a glass tube, are not limited to being arranged parallel or substantially parallel to the axis of the glass tube, but rather may be arranged at an angle with the axis of the glass tube.

The outer leads may be arranged obliquely or crookedly.

The discharge tube is not limited to a cold cathode fluorescent tube. A hot cathode fluorescent tube, a xenon tube or the like may be used instead.

The body of a ferrule is not limited to having a cylindrical shape, but rather may be ring-shaped or substantially C-shaped.

The number of elastic gripping portions is not limited to three pairs, but rather may be two or less pair, or four or more pairs. Further, the elastic gripping portions may be provided as singles, instead of in pairs, which are arranged circumferentially spaced apart.

The elastic gripping portions are not limited to being formed of cantilevered portions extending anteriorly or posteriorly, but rather may be formed of two-point supported portions which are supported on the body at their anterior and posterior ends.

The conductive connection between a cylindrical portion and an outer lead may be achieved by soldering.

A metallic material other than stainless steel may be used for relay terminals.

A metallic material other than nickel silver may be used for output terminals.

In the preferred embodiment 2, a metallic material other than nickel silver may be used for grounding terminals.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A discharge tube supporting structure to be arranged to support at least one discharge tube on a chassis wherein said at least one discharge tube includes a glass tube and a ferrule that has a substantially cylindrical shape and is fitted to at least one end portion of said glass tube, said discharge tube supporting structure comprising:

at least one supporting member arranged on the chassis to support said at least one discharge tube, said at least one supporting member including an elastic pressing portion arranged to press said discharge tube, a container room, a first opening, and a second opening, said first opening and said second opening being defined in surfaces of said at least one supporting member that are both perpendicular or substantially perpendicular and continuous with each other and also continuous with the container room, said container room being arranged to receive said ferrule and a portion of said glass tube through said first opening; and a stopper integrally provided with said at least one supporting member at an end of said at least one supporting member so as to cover aportion of said second opening, said stopper including a semicircular cut-out portion with a diameter that is smaller than an inner diameter of said ferrule and substantially equal to or slightly larger than an outer diameter of said glass tube so that said glass tube projects from said at least one supporting member through said semicircular cut-out portion while said discharge tube is attached to said at least one supporting member.

2. A discharge tube supporting structure as in claim 1, wherein said at least one discharge tube includes an outer lead axially projecting from an end portion of said glass tube, and said ferrule includes a conductive portion extending from an end edge of said ferrule toward said outer lead, the conductive portion being connected to said outer lead; and said stopper is arranged to engage with an end edge of said ferrule on an opposite side of said conductive portion.

3. A discharge tube supporting structure as in claim 2, wherein said conductive portion includes a cylindrical portion circumferentially connected to said outer lead so as to surround said outer lead.

4. A discharge tube supporting structure as in claim 1, wherein the inner diameter of said ferrule is larger than the outer diameter of said glass tube, and an elastic gripping portion provided on said ferrule abuts on an outer circumference of said glass tube so that said ferrule is concentrically or substantially concentrically held on said glass tube.

5. A discharge tube supporting structure as in claim 1, wherein said supporting member includes a holder made of synthetic resin and a connecting member mounted to said holder, and said stopper is provided on said holder.

6. A discharge tube supporting structure as in claim 1, wherein said supporting member includes a connecting member arranged to make conductive contact with said ferrule.

7. A discharge tube supporting structure according to claim 1, wherein said elastic pressing portion is arranged in said container room.

8. A supporting member to be arranged on a chassis to support at least one discharge tube, wherein said at least one discharge tube includes a glass tube and a ferrule that has a substantially cylindrical shape and is fitted to at least one end portion of said glass tube, said supporting member comprising:

an elastic pressing portion arranged to press said discharge tube, a container room, a first opening, and a second opening, said first opening and said second opening being defined in surfaces of said supporting member that are both perpendicular or substantially perpendicular and continuous with each other and also continuous with the container room, said container room being arranged to receive said ferrule and a portion of said glass tube through said first opening; and a stopper provided at an end of said supporting member so as to cover a portion of said second opening, said stopper including a semicircular cut-out portion with a diameter that is smaller than an inner diameter of said ferrule and substantially equal to or slightly larger than an outer diameter of said glass tube so that said glass tube projects from said supporting member through said semicircular cut-out portion while said discharge tube is attached to said supporting member, said semicircular cut-out portion being arranged to engage with said ferrule to lock said ferrule and restrict axial movement of said at least one discharge tube when the discharge tube is supported by said supporting member.

9. A supporting member as in claim 8, wherein said at least one discharge tube includes an outer lead axially projecting from an end portion of said glass tube, and a conductive portion extending from an end edge of said ferrule toward said outer lead is connected to said outer lead; and said stopper is arranged to engage with an end edge of said ferrule on an opposite side of said conductive portion.

10. A supporting member as in claim 8, wherein said elastic pressing portion is arranged to press said at least one discharge tube such that said at least one discharge tube is held with an outer circumference thereof abutting on or adjacent to an edge of said semicircular cut-out portion.

11. A supporting member as in claim 8, further comprising a holder made of synthetic resin and a connecting member mounted to said holder, wherein said stopper is provided on said holder.

12. A supporting member as in claim 8, further comprising a connecting member arranged to make conductive contact with said ferrule.

13. A lighting device comprising:

a discharge tube including a glass tube and a ferrule that has a substantially cylindrical shape and is fitted to at least one end portion of said glass tube;

a chassis including at least one supporting member to support said discharge tube, said at least one supporting member including an elastic pressing portion configured to press said discharge tube, a container room, a first opening, and a second opening, said first opening and said second opening being defined in surfaces of said at least one supporting member that are both perpendicular or substantially perpendicular and continuous with each other and also continuous with the container room, said container room being arranged to receive said ferrule and a portion of said glass tube through said first opening; and a stopper integrally provided with said at least one supporting member at an end of said at least one supporting member so as to cover a portion of said second opening, said stopper including a semicircular cut-out portion with a diameter that is smaller than an inner diameter of said ferrule and substantially equal to or slightly larger than an outer diameter of said glass tube so that said glass tube projects from said at least one supporting member through said semicircular cut-out portion while said discharge tube is attached to said at least one supporting member.

14. A lighting device as in claim 13, wherein said discharge tube includes an outer lead axially projecting from an end portion of said glass tube, and a conductive portion extending from an end edge of said ferrule toward said outer lead is connected to said outer lead, wherein said stopper is arranged to engage with an end edge of said ferrule on an opposite side of said conductive portion.

15. A lighting device as in claim 13, wherein the inner diameter of said ferrule is larger than the outer diameter of said glass tube, and an elastic gripping portion provided on said ferrule abuts on an outer circumference of said glass tube so that said ferrule is concentrically or substantially concentrically held on said glass tube.

16. A display device comprising:

a lighting device as in claim 13; and a display panel arranged on a front side of said lighting device.

17. A television receiver comprising a display device as in claim 16.

* * * * *